US010122671B2

United States Patent
Donahoe et al.

(10) Patent No.: US 10,122,671 B2
(45) Date of Patent: Nov. 6, 2018

(54) IDENTIFYING SERVICE PROVIDERS FOR ELECTRONICALLY RECEIVED SERVICE REQUESTS AND USING STORED ACCOUNT DATA TO CONNECT THE REQUESTER WITH PROVIDERS

(71) Applicant: Nextdoor.com, Inc., San Francisco, CA (US)

(72) Inventors: Thomas Donahoe, San Francisco, CA (US); Thomas F. Kaehler, San Francisco, CA (US); Gregory James, Concord, CA (US); Clifton Ray Williams, Berkeley, CA (US); Daniel J. Clancy, Los Altos, CA (US); Nirav N. Tolia, San Francisco, CA (US)

(73) Assignee: Nextdoor.com, Inc., San Francisco, CA (US)

( * ) Notice: Subject to any disclaimer, the term of this patent is extended or adjusted under 35 U.S.C. 154(b) by 318 days.

(21) Appl. No.: 14/930,264

(22) Filed: Nov. 2, 2015

(65) Prior Publication Data
US 2016/0373398 A1    Dec. 22, 2016

Related U.S. Application Data

(60) Provisional application No. 62/181,696, filed on Jun. 18, 2015.

(51) Int. Cl.
*G06F 15/16* (2006.01)
*H04L 12/58* (2006.01)
(Continued)

(52) U.S. Cl.
CPC ............ *H04L 51/32* (2013.01); *G06Q 50/01* (2013.01); *G06Q 50/10* (2013.01); *H04L 67/306* (2013.01)

(58) Field of Classification Search
None
See application file for complete search history.

(56) References Cited

U.S. PATENT DOCUMENTS 8,775,351 B2 * 7/2014 Moore ............... G06Q 30/0259
706/46
2003/0041005 A1 * 2/2003 Parry .................... G06Q 30/08
705/37

(Continued)

OTHER PUBLICATIONS

European Patent Office, "Search Report" in application No. 16174728.2-1958, dated Oct. 21, 2016, 10 pages. European Claims in application No. 16174728.2-1958, dated Oct. 2016, 5 pages.

*Primary Examiner* — Mohamed Ibrahim
(74) *Attorney, Agent, or Firm* — Elliot H. Karlin; Hickman Palermo Becker Bingham LLP

(57) ABSTRACT

A system and method for facilitating the locating and hiring of service providers is provided. In an embodiment, a social networking server provides an interface for users of social networking accounts to create service request. When the social networking server computer receives a service request for a particular type of service provider, the social networking server computer identifies service providers of the particular type and sends the service request to the service providers. In response to receiving an indication that a particular service provider is available to fulfill a service request, the social networking server computer sends a message to the service requester that identifies the particular service provider and indicates that the service provider is available to fulfill the service request. In response to receiving an indication from the service requester that the service requester wishes to hire the service provider, the social networking server computer sends a message to the service provider indicating that the service provider has been hired to fulfill the service request.

22 Claims, 20 Drawing Sheets

(51) Int. Cl.
*G06Q 50/00* (2012.01)
*G06Q 50/10* (2012.01)
*H04L 29/08* (2006.01)

(56) References Cited

U.S. PATENT DOCUMENTS

| | | | |
|---|---|---|---|
| 2007/0282621 A1 | 12/2007 | Altman et al. | |
| 2011/0161167 A1* | 6/2011 | Jallapuram | G06Q 10/00 705/14.49 |
| 2013/0073474 A1* | 3/2013 | Young | G06Q 10/00 705/319 |
| 2014/0156442 A1* | 6/2014 | Cushing | G06Q 30/0611 705/26.4 |

* cited by examiner

IDENTIFYING SERVICE PROVIDERS FOR ELECTRONICALLY RECEIVED SERVICE REQUESTS AND USING STORED ACCOUNT DATA TO CONNECT THE REQUESTER WITH PROVIDERS

BENEFIT CLAIM

This application claims the benefit of provisional application 62/181,696, filed Jun. 18, 2015, the entire contents of which is hereby incorporated by reference as if fully set forth herein, under 35 U.S.C. § 119(e).

FIELD OF THE DISCLOSURE

The present disclosure generally relates to data processing for use with mobile communications devices for more efficient brokering of the hiring of service providers by requesters. The disclosure more specifically relates to using stored account data on a server computer to connect a plurality of service providers to a service requester over a network to enable the requester to select and hire one of the service providers to provide a service.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Service providers, or individuals that provider specific types of services, can be extremely useful for certain situations but extremely difficult to locate. For example, a person who may be willing to act as a babysitter for neighbors may be extremely useful for a neighborhood, but extremely difficult to locate through conventional means. If a parent or other party needs a babysitter but has not used one in a particular city before, or is seeking a new one for other reasons, the typical means of locating one have included open communications to friends or relatives seeking a referral. This is time-consuming and inefficient.

For many types of services, business rating websites allow a user to search for businesses of particular types and to look up reviews of the businesses. While useful for locating established business entities, business rating websites are not useful for finding service providers who provide the service part time, such as a babysitter. Where a pizza parlor is likely to have an entity account with a business rating website that includes reviews of the pizza parlor, a menu, and hours of operation, a college student who is willing to babysit on nights and weekends to earn some extra money likely would not have that information available on a business rating website.

Additionally, business rating websites may be inefficient for finding service providers who are available for specific time periods. The pizza parlor in the above example likely has hours of operation that do not change. In contrast, the college student in the above example may have plans on Tuesday and Saturday night one week, no plans the next week, and be unavailable for the entirety of the following week while studying for finals. Even if the business rating websites listed service providers such as part time babysitters, a user of the system would have to individually contact each service provider to determine whether the service provider is available when needed. It is also unlikely that a service provider who is willing to perform part time service for neighbors would be willing to maintain and continually update a current schedule so that the provider's neighbors could see the provider's availability from day to day.

Other methods of finding service providers include requesting recommendations through a social networking account. For example, a user may post on a social networking account that he is searching for a babysitter for Tuesday and is searching for recommendations. A few people may respond with recommendations for babysitters they have used in the past, but the requester would still need to contact each babysitter individually. Additionally, if a person who was willing to babysit saw the post with the recommendations, the babysitter may feel discouraged from responding to the request for recommendations with an offer to babysit. Even if a service provider was willing to respond to requests for recommendations posted on a social network, the service provider would need to be constantly checking the social networking website to find these posts. Where the service provider is a part time babysitter, it is unlikely that the service provider would be willing to expend that large amount of effort into finding clients.

Another issue with modern approaches to finding service providers is that some services entail a level of trust between the service provider and the service requester. For example, a babysitter is generally left alone in a requester's house with that requester's children. The requester is unlikely to hire a babysitter that the requester does not know or trust for such a job. Even if the service requester identifies a babysitter, the requester needs a reason to trust the babysitter to be left alone in the requester's house with the requester's children.

Therefore, there is a need for a system or method for facilitating the locating and hiring of trustworthy service providers. Specifically, there is a need for a computer-implemented method that increases the efficiency with which a user can find service providers that are available to accept a service request at a specific time without putting a burden on the service providers that the service providers are unable or unwilling to handle.

A technological problem exists in finding and hiring service providers. Current electronic means for finding businesses are inadequate for finding many types of service providers. The problems identified by the inventors in this disclosure have been identified in the context of developing social networking services that use digital electronic mobile computing devices to communicate over data networks to server computers that provide other kinds of social networking services. An electronic system that maintains customers by providing efficient access to service providers and maintains service providers by decreasing the difficulties in managing an online account for the service provider is needed to solve this technology based problem.

SUMMARY

The appended claims may serve as a summary of the disclosure.

DETAILED DESCRIPTION

Figure 1:
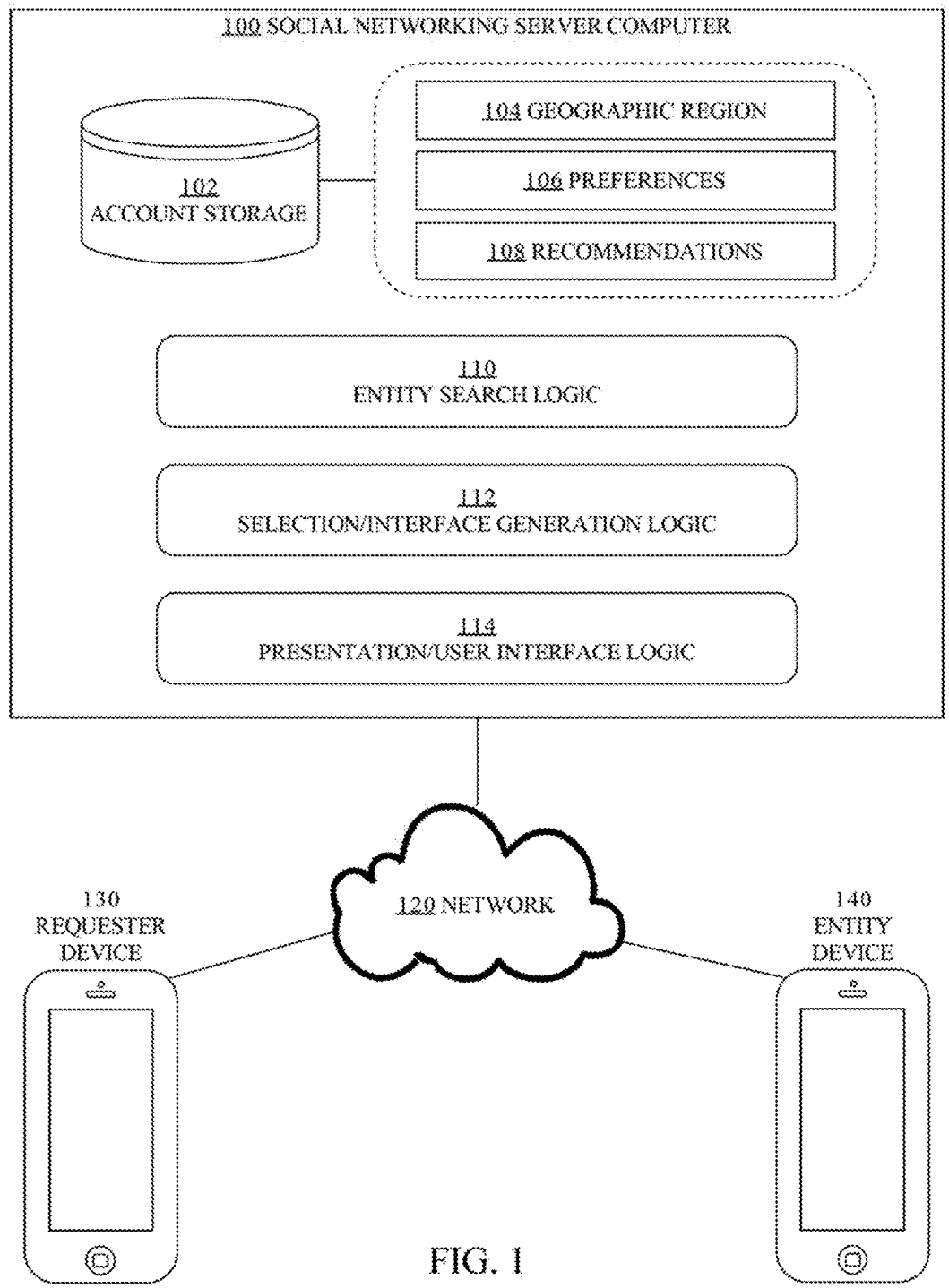
FIG. 1 illustrates a system architecture for facilitating the creation and fulfillment of service requests between requestors and service providers.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. The description is provided according to the following outline:

General Overview
Structural Overview
Creation of Service Requests
Sending Service Requests to Service Providers
Sending Service Requests to a Subset of Service Providers
Sending Availability Responses to Requester
Sending Hired Selection to Particular Service Provider
Additional Embodiments
Hardware Overview General Overview Aspects of the disclosure generally relate to computer-implemented techniques for facilitating the creation and fulfillment of service requests. In an embodiment, a server computer stores account information, such as social networking accounts, for a plurality of requesters and a plurality of service providers. The server computer receives a service request for a particular type of service from a particular requester account. The server computer identifies one or more service providers that perform the service identified by the service request in a geographic region associated with the service request. The server computer sends the service request directly to the service providers' accounts. When the server computer receives a response from a particular service provider account indicating availability to complete the service request, the server computer sends a notification to the particular requester account indicating that a service provider responded with an availability to complete the service request. When the server computer receives a hire response from the requester account, the server computer sends a message to the particular service provider indicating that the service provider has been hired to fulfill the particular service request.

In an embodiment, a method comprises: storing, at a social networking server computer, account information for a plurality of social networking accounts comprising geographic data and user identification data; receiving, through a graphical user interface executing on a first computing device associated with a first social networking account of the plurality of social networking accounts, input requesting one or more services from a particular type of service provider in a particular geographic region; identifying one or more second social networking accounts of the plurality of social networking accounts, based, at least in part, on account information for the one or more second social networking accounts that indicates that the one or more second social networking accounts are associated with the particular type of service provider for the particular geographic region; sending, over a network to one or more second computing devices associated with the one or more second social networking accounts, a service request corresponding to the received input from the first computing device; receiving, from a particular computing device of the one or more second computing devices, a response to the service request indicating an availability to fulfill the service request; sending, to the first computing device, an identification of a particular social networking account associated with the one or more second computing devices and the response to the service request indicating the availability to fulfill the service request; receiving, through the graphical user interface executing on the first computing device, input selecting a hire option for the particular social networking account; sending, to the particular computing device, a message indicating that the particular social networking account associated with the second computing device has been selected to fulfill the service request.

Structural Overview

FIG. 1 illustrates a data processing system architecture for facilitating the creation and fulfillment of service requests between requestors and service providers.

In an embodiment, a social networking server computer 100 is communicatively coupled to requester device 130 and entity device 140 over network 120. Social networking server computer 100 may be configured to interact with one or more other devices such as an application server and/or other third party devices. Examples of network 120 include, without limitation, one or more networks, such as one or more Local Area Networks (LANs), one or more Wide Area Networks (WANs), one or more Ethernets or the Internet, or one or more terrestrial, satellite or wireless links. The various elements of FIG. 1 may also have direct (wired or wireless) communications links, depending upon a particular implementation.

Requester device 130 and entity device 140 may be any of a laptop, netbook, personal computer, workstation, smartphone, PDA, tablet, or other computing device capable of accessing a social networking account that is maintained by social networking server computer 100. In an embodiment, requester device 130 and entity device 140 may access the social networking accounts through an application executing on requester device 130 and entity device 140 respectively.

Requester device 130 and entity device 140 may be programmed or configured to display social networking pages generated by social networking server computer 100 and to interact with the social networking pages through application programming interfaces of either a web browser or other application executing on requester device 130 and entity device 140. In an embodiment, requester device 130 generates service requests, sends messages to service providers, and displays notifications relating to the service requests. In an embodiment, entity device 140 receives service requests, sends availability responses to requester device 140, and displays notifications relating to the service requests. While the figures refer to requester device 130 and entity device 140, multiple devices may be used by either the requester or the service provider. For example, the requester may send the initial service request through a desktop computing device, but receive and respond to the latter notifications using a smartphone.

In an embodiment, social networking server computer 100 is programmed or configured with functional logic that may be used to facilitate a method for connecting service requesters with service providers through a social networking interface. In an embodiment, social networking server computer 100 contains account storage 102, entity search logic 110, selection/interface generation logic 112, and presentation/user interface logic 114. Social networking server computer 100 may also include other devices, components, or elements of a computer system such as volatile or non-volatile memory, non-volatile storage such as disk, and I/O devices or interfaces as seen and described, for example, in connection with FIG. 20. For purposes of illustrating a clear example, only logical elements relevant to the present invention are shown and other embodiments may implement many other kinds of functional logic for other purposes, features or aspects of service.

Account storage 102 may be configured or programmed to store account data relating to a plurality of social networking accounts. Account storage 102 may comprise one or more tables or files that are integrated with data storage devices or databases that support other aspects of the system. Account information may include unique identifiers and passwords, geographic region 104, preferences 106, recommendations 108, prior interaction data, and social connection data. Account information may include a database of social networking accounts indexed by unique identifiers. Account information may be stored as individual files, in data structures in memory, in rows in a database table, in flat files or spreadsheets, or other forms of digitally stored data.

As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, Oracle® Database, MySQL, IBM® DB2, Microsoft® SQL Server, Sybase®, and PostgreSQL. However, any database may be used that enables the systems and methods described herein.

Geographic region 104 and preferences 106 may be input by the creator of the social networking account. For example, when a user creates a social networking account, social networking server computer 100 may prompt the user to input user information, such as the user's name and home address. The input information may be stored with the social networking account of the user. Additionally, geographic region 104 and preferences 106 may be created and stored based on a user's interactions with the social networking account. For example, if a user indicates the existence of three children in a request for a babysitter, social networking server computer 100 may store information indicating that the account is associated with three children. As another example, if a user selects a specific geographic region when searching for a plumber, the selected geographic region may be stored with the account.

Recommendations 108 may include recommendations created by a plurality of accounts for specific entity accounts. For example, after a user of a requesting account utilizes the services of a particular entity, the user may create a recommendation for the particular entity through a graphical user interface executing on the user's computing device. The recommendation may be stored generally, or stored in connection with a particular type of service for the particular entity or with respect to one or more pieces of information associated with the service request. For example, if the service request was for a handyman and the particular job was retiling a bathroom, the recommendation may be stored for the particular entity account under the categories of 'handyman' and 'tiling.' If the particular entity later decides to become a clown for children's birthday parties, a search for the particular entity as a clown may not include the recommendations based on the particular entity as a handyman proficient in tiling.

Social connection data may indicate connections between social networking accounts. For example, in some embodiments, social networking accounts are linked based on geographical data, such as a neighborhood associated with the social networking account. In other embodiments, social networking accounts may be linked based on requests and acceptances made by users of the social networking accounts. While the present disclosure refers to geographic regions as the basis for identifying entities to fulfill service requests, in other embodiments the basis for identifying entities may include, through a friendship based social network, connections between the requester account and the service provider account or connections between the connector account and other accounts connected to the service provider account.

Entity search logic 110 may be programmed or configured to identify entity accounts that match criteria specified by a service request. Entity search logic 110 may access account storage 102 to identify entity accounts associated with a geographic region that matches the service request. Entity search logic 110 may also identify one or more secondary geographic regions that are located in close proximity to the geographic region that matches the service request. Entity search logic 110 may access account storage to identify entity accounts associated with the one or more secondary geographic regions. Entity search logic 110 may send the identified entities to selection/interface generation logic 112 for further filtering or to presentation/user interface logic 114 in order to generate and send service requests to the identified entity accounts.

Selection/interface generation logic 112 may be programmed or configured to identify a subset of specific entity accounts identified by entity search logic 110, recommendations, and interface elements, which are relevant to one or more entity service requests. Selection/interface generation logic 112 may also generate different graphical user interfaces based on particular selections. For example, selection/interface generation logic 112 may be programmed or configured to identify the particular type of service requested based on user input and generate specific interfaces with controls for adding information relevant to the particular type of service requested. Thus, the interface generated for a search for a handyman may differ from the interface generated for a search for a babysitter.

Social networking server computer 100 may be programmed or configured to interact with requester device 130 and entity device 140 through presentation/user interface logic 114. Presentation/user interface logic 114 may be programmed or configured to cause display of graphical user interfaces on requester device 130 and entity device 140. Presentation/user interface logic 114 may be further configured to send messages to and receive messages from requester device 130 and entity device 140. Presentation/user interface logic 114 may receive service requests from requester device 130 and send the service requests to entity search logic 110. In an embodiment, presentation/user interface logic dynamically generates displays based on selections made by requester device 130, entity device 140, and selection/interface generation logic 112. In an embodiment, presentation/user interface logic 114 generates a map that encompasses requester device 130 and entity device 140 to be displayed on either requester device 130 or entity device 140.

Creation of Service Requests

Figure 2:
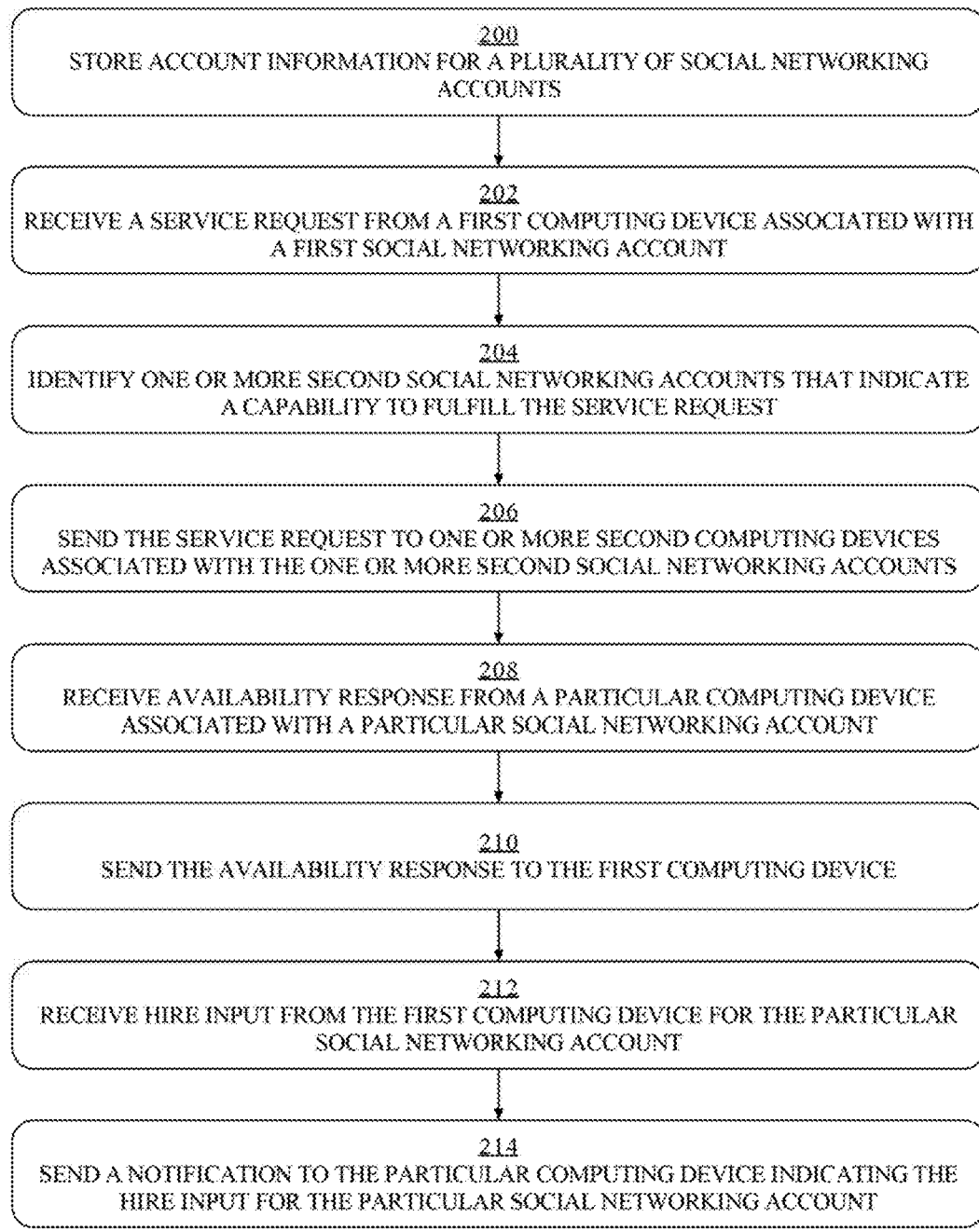
FIG. 2 illustrates a method for facilitating the creation and fulfillment of service requests between a requesting device and an entity device.

FIG. 2 illustrates a method for facilitating the creation and fulfillment of service requests between a requesting device and an entity device. FIG. 2, and each other flow diagram or process description in this disclosure, is intended to illustrate an algorithm that may be implemented using one or more computer programs, programmed digital logic, and/or other software elements or hardware elements in a general-purpose computer or special-purpose computer, in various embodiments. The algorithm of FIG. 2 and the other diagrams may be programmed, for example, using any number of source code files or modules that are compiled, interpreted and/or linked to form executables that a general-purpose computer or special-purpose computer can execute. A programming language or development environment such as JAVA, C++, OBJECTIVE-C, C, JAVASCRIPT and the like may be used to develop programs based on the algorithms that are disclosed herein.

At step 200, account information for a plurality of social networking accounts is stored. While the present disclosure describes the use of a social networking accounts to facilitate the connection of the service requesters to service providers, the system described herein may be implemented through an application that does not use social connections. For example, service requests may be geographically based and recommendations may be displayed without using social connections. Social networking server computer 100 may store user identifications, passwords, geographic region 104, preferences 106, recommendations 108, prior interaction data, and social connection data. Past interaction data may comprise previous service requests made by the user of the social networking account, entities previously hired by the user of the social networking account, recommendations made by the user of the social networking account, recommendations made by others about the user of the social networking account, and past responses to service requests.

At step 202, a service request is received from a first computing device associated with a first social networking account. For example, requester device 130 of FIG. 1 may initially access social networking server computer 100 through presentation/user interface logic 114. Presentation/user interface logic 114 may cause display of a sign-in page on requester device 130. After presentation/user interface logic 114 has verified the credentials input into requester device 130, presentation/user interface logic 114 may cause display of a home page on requester device 130. In an embodiment, the home page includes an option to create a service request. In some embodiments, the option to create a service request includes a specification of a particular type of service request. For example, a drop down list may include a plurality of entity types, such as babysitter, handyman, IT personnel, pet sitter, painter, etc. In another embodiment, presentation/user interface logic 114 causes display of an option to specify a particular type of service request after receiving a first selection of the option to create a service request.

Figure 3:
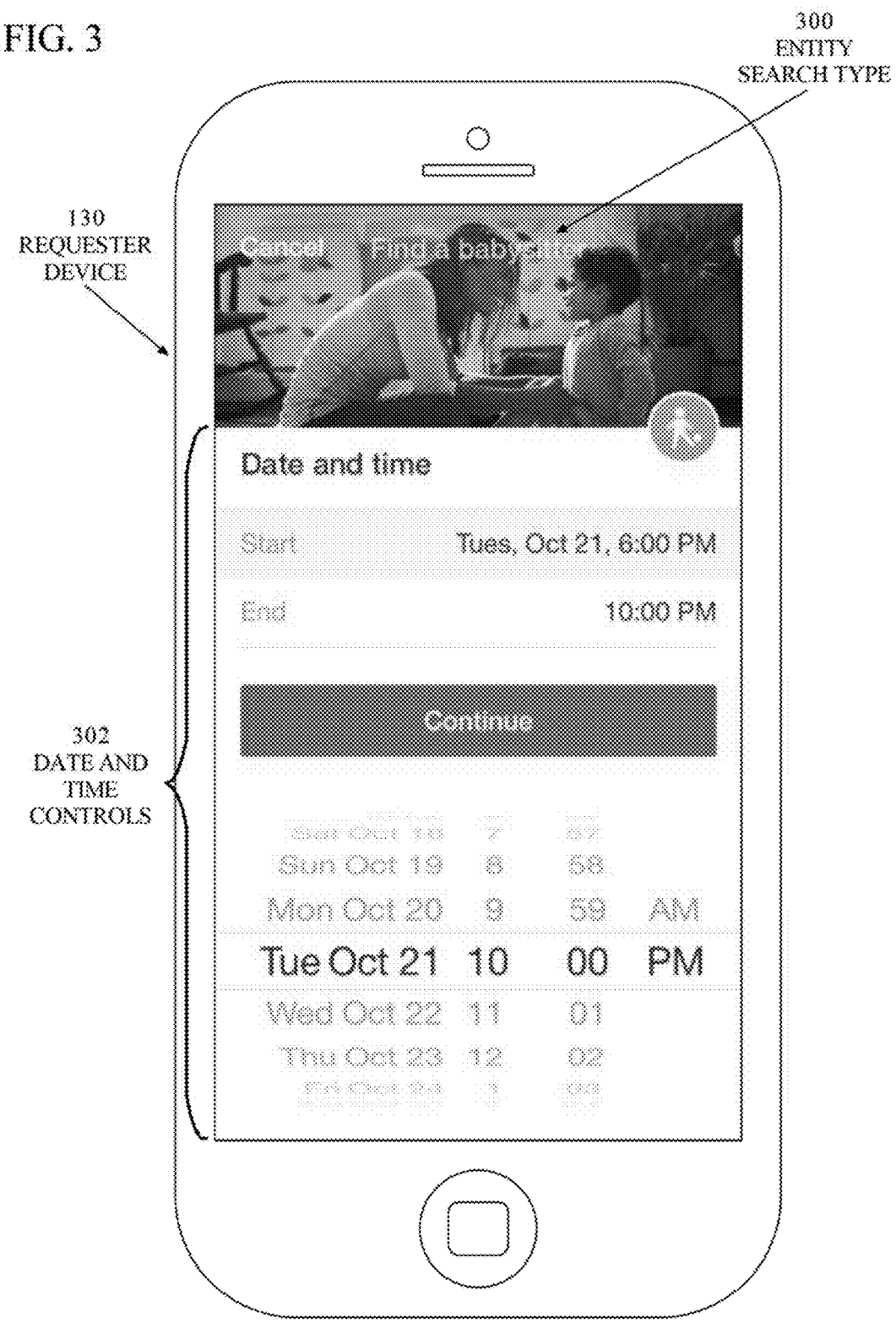
FIG. 3 is a requester computing device displaying an example graphical user interface for creating a service request.

FIG. 3 illustrates a requester computing device displaying an example graphical user interface for creating a service request. FIG. 3 to FIG. 19, inclusive, each represents one embodiment of output displays that may be generated using application programs ("apps") on mobile devices alone or in coordination with server-side application programs executed by the server computer 100. The description herein of FIG. 3 to FIG. 19, inclusive, identifies operations that may be performed using such apps or server-side application programs, and is intended to describe algorithms that may be implemented using one or more computer programs, programmed digital logic, and/or other software elements or hardware elements in a general-purpose computer or special-purpose computer, in various embodiments. This manner of expression is used because it is a natural and conventional manner of expression for software engineers, programmers and others of ordinary skill in the art to which this disclosure pertains, to convey algorithms to one another. The algorithms represented by FIG. 3 to FIG. 19, inclusive may be programmed, for example, using any number of source code files or modules that are compiled, interpreted and/or linked to form executables that a general-purpose computer or special-purpose computer can execute. A programming language or development environment such as JAVA, C++, OBJECTIVE-C, C, JAVASCRIPT and the like may be used to develop programs based on the algorithms that are disclosed herein.

Requester device 130 may be any computing device capable of interacting over a network with social networking server computer 100 or an application server computer. While requester device 130 is depicted as a smart phone, requester device 130 may also be a personal computer, tablet computing device, PDA, laptop, or any other computing device capable of transmitting and receiving information and performing the functions described herein. For purposes of illustrating a clear example, some embodiments herein are described with respect to use with mobile computing devices such as APPLE IPHONE devices, ANDROID devices, and other smartphones, but the broad functions described herein may be used with many other computing devices. For example, embodiments may be implemented with computers that use HTTP, HTML and web browsers rather than device-specific apps.

In an embodiment, requester device 130 has installed and executes a social networking application ("app") that is configured to perform certain functions as further described herein for generating service requests, viewing service provider information, and sending messages to service providers. Various functions described herein may be implemented via calls of the app using an application programming interface (API) implemented at social networking server computer 100 or an application server computer.

Requester device 130 displays a graphical user interface which includes entity search type 300 and date and time controls 302. Entity search type 300 indicates the type of service provider requested by requester device 130. In an embodiment, the entity search type is selected by requester device 130 from a plurality of entity search types. In some embodiments, the entity search type is built into the service request selected by requester device 130. For example, a home screen may display as an option "Find Babysitters." Selection of the "Find Babysitters" option may cause the display of FIG. 3 to be generated. Date and time controls 302 are controls for indicating a date and time for the particular service request. In an embodiment, date and time controls 302 are only displayed for particular entity search types.

For example, a selection of an option to search for a babysitter may cause the display of FIG. 3 to be generated and displayed on requester device 130. In contrast, requests that do not generally include temporal limitations, such as a request for a painter, may not cause the display of date and time controls 302. In some embodiments, date and time controls 302 are optional for specific types of service requests. For instance, in the painter example described above, a user may wish to indicate that the painting job needs to be finished by a specific date and time. In that situation, the user may select an option on a request interface to cause display of date and time controls 302. Once a selection of a particular date and time have been selected, a selection of the "Continue" option may cause presentation/user interface logic to cause display of an interface for adding additional information to the service request.

Figure 4:
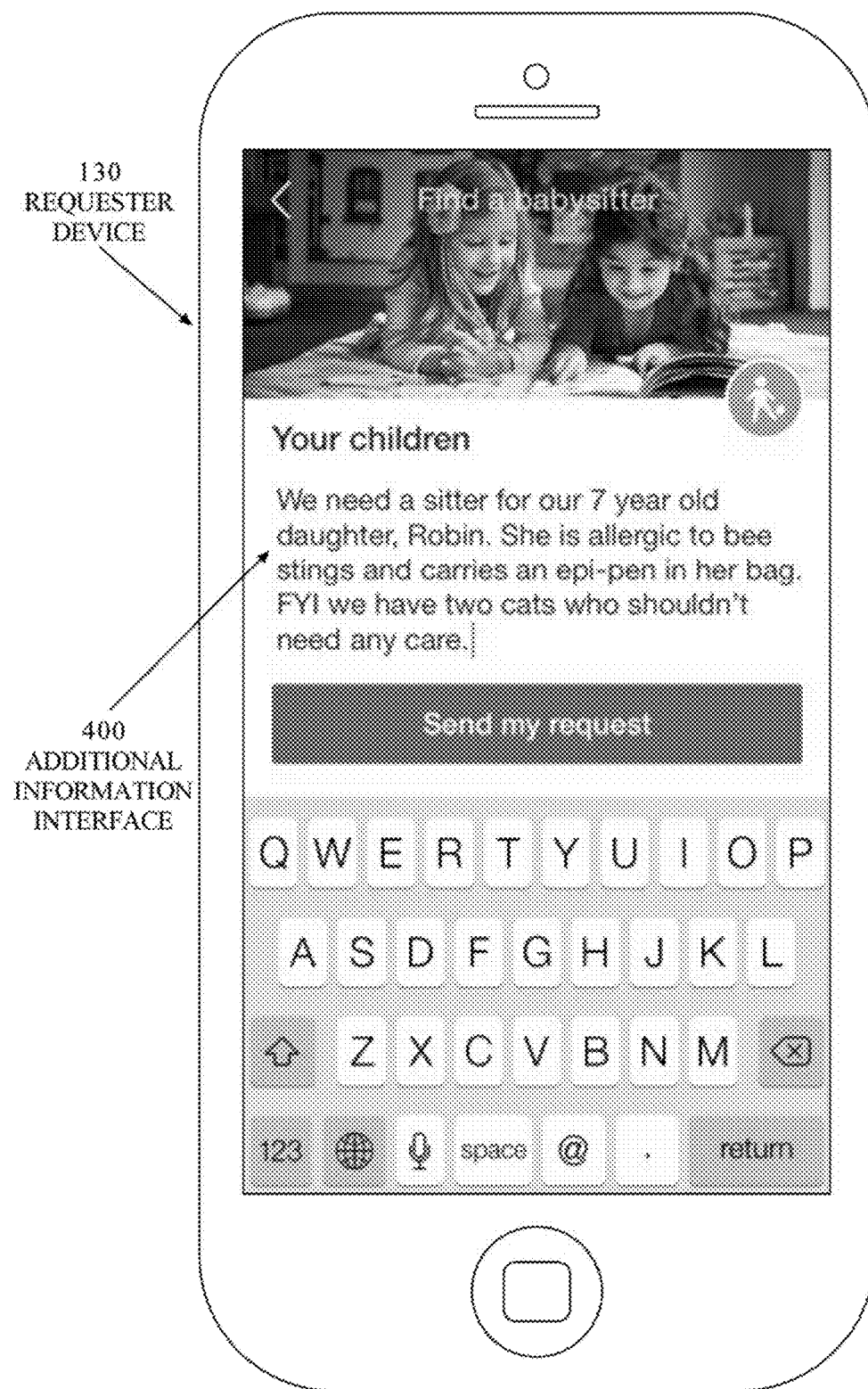
FIG. 4 is a requester computing device displaying an example graphical user interface for adding additional information to a service request.

FIG. 4 is a requester computing device displaying an example graphical user interface for adding additional information to a service request. Requester device 130 in FIG. 4 contains additional information interface 400. In an embodiment, presentation/user interface logic 114 causes display of additional information interface 400 for each service request type. For example, a generic interface may include the phrase "Additional Information" instead of "Your children" depicted in FIG. 4. In this manner, presentation/user interface logic 114 may standardize the displays sent to requester device 130. Thus, a single type of display may be used for all types of service requests. In an embodiment, the standardized display is dynamically created based on the type of service request. For example, the banner of FIG. 4 may be displayed with the "Your children" title for a service request for a babysitter while a different banner with a "Plumbing needs" title may be displayed for a plumber.

In some embodiments, the standardized display is used for entity types not depicted in the option to select a particular type of entity. The option to select a particular type of entity may include a selection of "other" that allows a person to enter in a custom entity type. For example, an option for "Birthday Clown" may not exist in the option to select a particular type of entity. A requester may select "Other" and type in "Birthday Clown." The selection of the "Other" option may cause display of the standardized display. In the "Additional Information" section of the standardized display, the requester may type "Magic tricks and balloon animals preferred. No sad clowns or mimes, please."

In some embodiments, one or more particular entity type displays may be generated for a service request. Presentation/user interface logic 114 may receive a selection a particular entity type through service request controls, such as the drop down menu discussed above. In response, presentation/user interface logic 114 may send the particular entity type to selection/interface generation logic 112. Selection/interface generation logic 112 may generate one or more interfaces for the particular entity type and send the generated interfaces to presentation/user interface logic for display on requester device 130. The generated interfaces may include controls for adding specific types of information. The specific types of information entered into the generated interfaces may later be matched to entities of the particular type with various specialties, used to filter comments about specific entities, or stored with responses from entities in order to update the entity information. Methods of using the specific types of information entered into the generated interfaces are described in more detail below.

Figure 5:
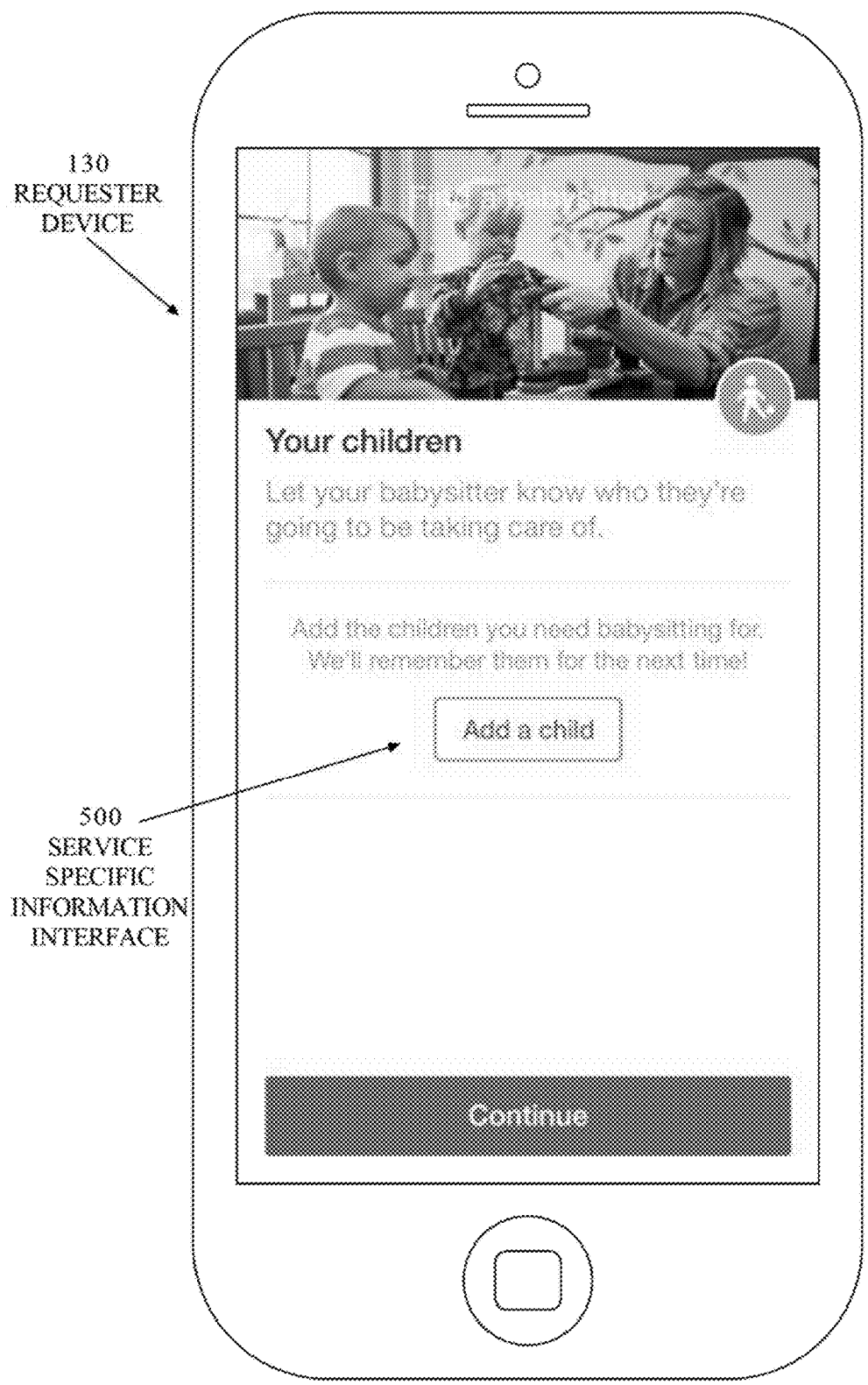
FIG. 5 is a requester computing device displaying an example graphical user interface with controls for entering specific information pertaining to a service request from a particular type of service provider.

FIG. 5 is a requester computing device displaying an example graphical user interface with controls for entering specific information pertaining to a service request from a particular type of service provider. Requester device 130 in FIG. 5 contains service specific information interface 500. Service specific information interface 500 may be generated by selection/interface generation logic 112 to provide information useful for describing the service request.

For example, in FIG. 5 service specific information interface 500 contains controls for adding children to a babysitter request. In response to receiving a selection of the "Add a child" option, presentation/user interface logic 114 may cause display of a secondary user interface for describing a child. Different versions of service specific information interface 500 may be available for different types of service requests. For example, in response to receiving a request for IT personnel, selection/interface generation logic 112 may generate service specific information interface 500 with controls for adding computers to the request, such as desktops, laptops, tablets, or smartphones.

Figure 6:
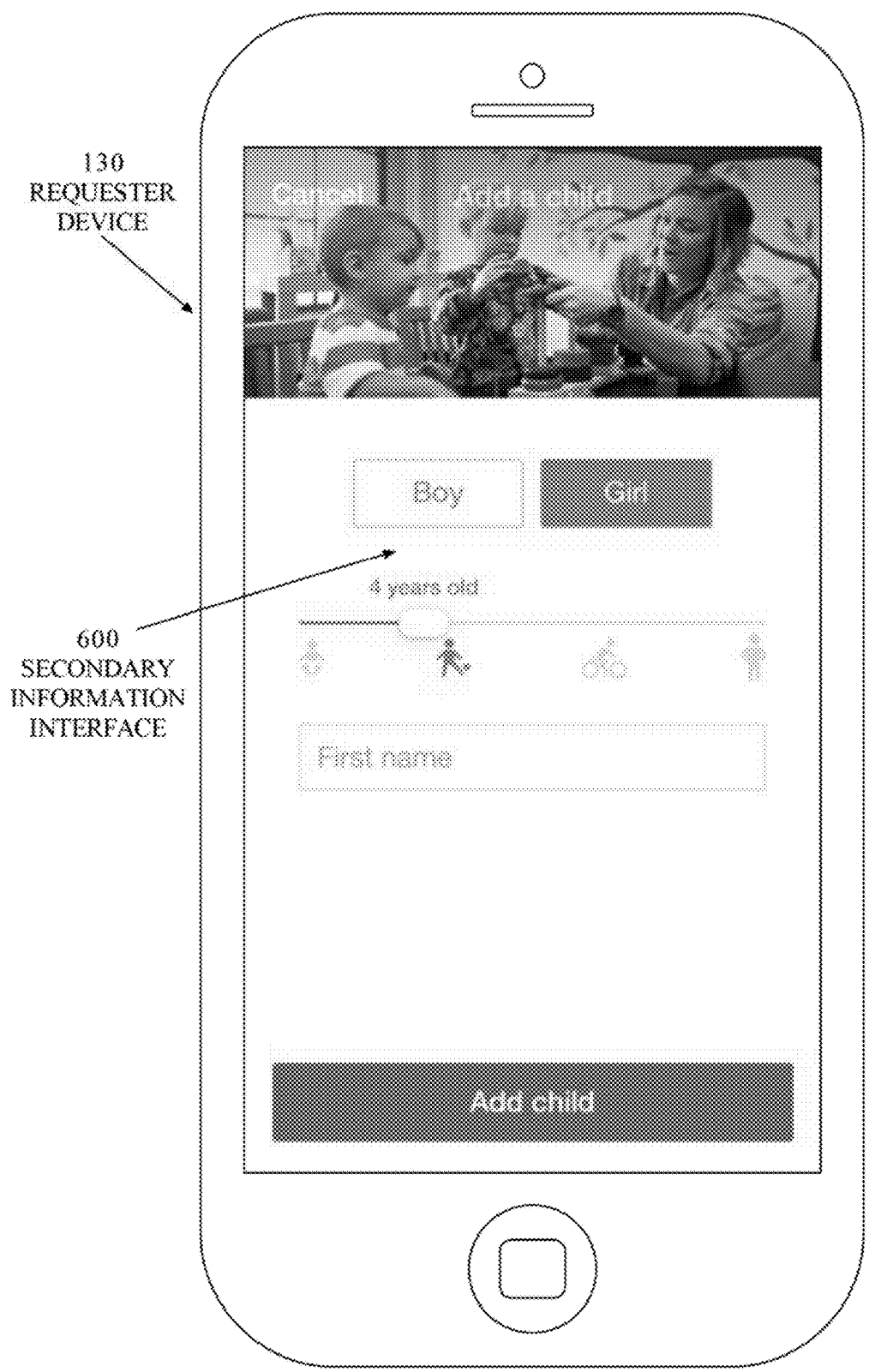
FIG. 6 is a requester computing device displaying an example graphical user interface with secondary controls for entering specific information pertaining to a service request from a particular type of service provider.

FIG. 6 is a requester computing device displaying an example graphical user interface with secondary controls for entering specific information pertaining to a service request from a particular type of service provider. Requester device 130 in FIG. 6 contains secondary information interface 600. Secondary information interface 600 contains controls for describing an option selected in service specific information interface 500 of FIG. 5. For example, in FIG. 6 secondary information interface 600 contains controls for selecting a gender, age, and name for a child added by the "Add a child" option of FIG. 5. In the IT personnel example, secondary information interface 600 for a computer added in service specific information interface 500 of FIG. 5 may include controls for describing the type of computing device, the manufacturer of the computing device, and the operating system of the computing device.

In some embodiments, service specific information interface 500 of FIG. 5 and secondary information interface 600 of FIG. 6 are combined into a single interface. For example, a selection of "Add a child" may cause presentation/user interface logic 114 to generate controls on service specific information interface 500 for adding the additional information of FIG. 6 without navigating to a new interface. In other embodiments, service specific information interface 500 of FIG. 5 and secondary information interface 600 of FIG. 6 are separated into three or more interfaces. For example, a selection of the "Add a child" option may cause display of an interface for adding a gender of the child. A selection of a gender may cause display of an interface for adding an age of the child, and so on.

In an embodiment, information entered in the interfaces of FIG. 5 and FIG. 6 is stored in connection with the social networking account executing on requester device 130. The stored information may be used by presentation/user interface logic 114 the next time the social networking account is used to generate a service request. For example, upon receiving a subsequent selection of a request for a babysitter, presentation/user interface logic 114 may display the stored children information previously entered into the interfaces of FIG. 5 and FIG. 6.

Presentation/user interface logic 114 may also display controls for accepting the stored children information, rejecting the stored children information, or updating the stored children information. A user may wish to remove a child who is currently on vacation, add a child who was not previously listed, or update the age of a child. In the IT personnel example, presentation/user interface logic 114 may list previously identified computers with options to select one of the previously identified computers, edit a previously identified computer, add a new computer, or remove a previously identified computer.

Figure 7:
FIG. 7 is a requester computing device displaying an example graphical user interface with controls for adding additional information to a service request from a particular type of service provider.

In an embodiment, after presentation/user interface logic 114 has exhausted interfaces for adding service specific information to the service request, presentation/user interface logic 114 may display controls for adding additional information to the service request that is not covered by the service specific interfaces. FIG. 7 is a requester computing device displaying an example graphical user interface with controls for adding additional information to a service request from a particular type of service provider. Requester device 130 in FIG. 7 contains additional information interface 400 generated after receiving information through the provider specific interfaces of FIG. 5 and FIG. 6. Additional information interface 400 contains an editable text box which can be used to further describe the service request. For a babysitter request, such as the one depicted in FIG. 7, additional information interface 400 may prompt the user to enter extra information such as transportation, pets, and special needs. In the IT personnel example, additional information interface 400 may prompt the user to describe the problem the user is having with the computing device identified in the interfaces of FIG. 5 and FIG. 6.

In either FIG. 4 or FIG. 7, social networking server computer 100 receives the completed service request through a selection of the "send request" option. In basic embodiments, a service request may include just an indication of the type of service requested. Geographic data may be extracted from the social networking account associated with requester device 130. An interface displayed on requester device 130 may include options to search for particular types of service providers, either through individual buttons or selectable menus. Upon selection of the particular type of service provider, social networking server computer 100 may register the receipt of a service request and the method may proceed to step 204.

Figure 8:
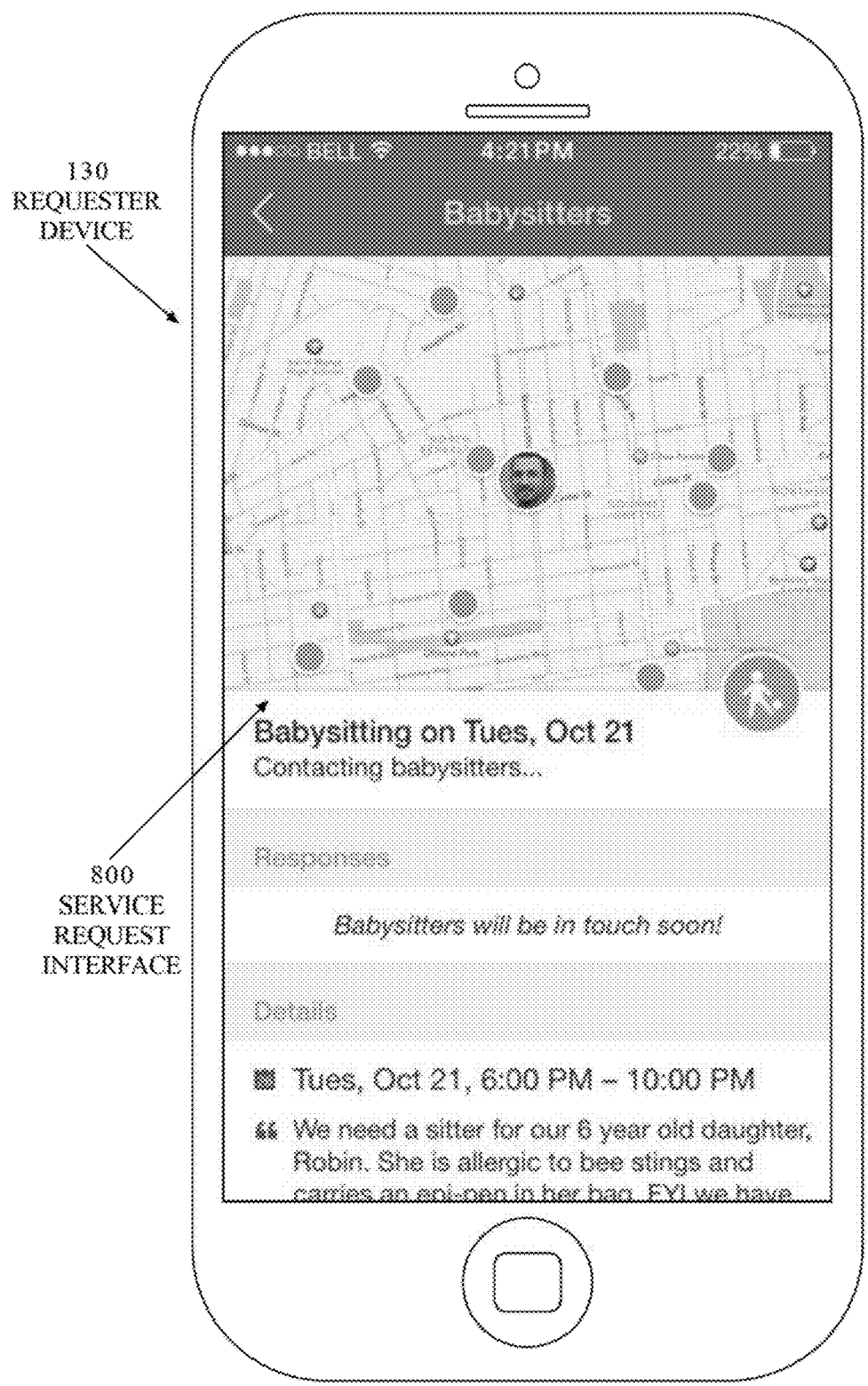
FIG. 8 is a requester computing device displaying an example graphical user interface depicting details relevant to a service request.

Once social networking server computer 100 receives the completed service request, presentation/user interface logic 114 may generate an interface related to the request. The interface related to the request may include details entered through the interfaces of FIG. 3, FIG. 4, FIG. 5, FIG. 6, and FIG. 7. In an embodiment, the interface related to the request may also include any received responses and a map indicating general locations of entities being contacted. FIG. 8 is a requester computing device displaying an example graphical user interface depicting details relevant to a service request. Service request interface 800 includes details about the service request, responses from service providers, and a map indicating positions of the user of the social networking account associated with requester device 130 and service providers of the specific service type in the same geographic region as the user.

Sending Service Requests to Service Providers

Referring back to FIG. 2, at step 204 one or more second social networking accounts that indicate a capability to fulfill the service request are identified. For example, social networking server computer 100 may use entity search logic 110 to identify social networking accounts that match the search request. In some embodiments, social networking accounts include identifying information that list the social networking accounts as specific types of service providers. For example, a particular social networking account may be stored with data indicating that the user of the social networking account can fulfill requests for babysitters and pet groomers.

In response to receiving a service request for babysitters, social networking server computer 100 may identify the particular social networking account as being associated with the geographic region of the service request and containing data indicating that the user of the social networking account can fulfill requests for babysitters.

In an embodiment, service providers identify services that the service provider is capable of providing. For example, presentation/user interface logic 114 may display an interface on a computing device associated with a social networking account of a service provider with controls for identifying services the provider wishes to provide for the geographic region. For example, a drop down list may be populated with popular service request titles, such as "babysitter," "house keeper," "plumber," "gardener," "IT personnel," etc. In an embodiment, a service provider may select multiple service types. For example, a service provider may list himself as "gardener" and "plumber."

In an embodiment, presentation/user interface logic 114 may list "other" as an option. A selection of "other" may cause presentation/user interface logic 114 to display an editable text box for adding in the particular type of service. In some embodiments, different text boxes are used for different services. For example, a first text box may be used by a particular provider account for "Birthday Clown" and a second text box may be used for "Dance Instructor." If requester device 130 sent a service request for a dance instructor, entity search logic 110 may identify the particular provider account. Service types that are not exact matches may also be identified by entity search logic 110. For example, in response to a service request for a Dance Teacher, entity search logic 110 may identify the matching word "Dance" between "Dance Teacher" and "Dance Instructor" and identify the particular provider account. In some embodiments, entity search logic 110 creates different tiers of searches. For example, entity search logic 110 may first search for exact matches.

A second search may include matches of one or more words from the search request to one or more words of the service type listed by the provider. A third search may include matches of words from the description of the service request to the service type listed by the provider. Thus, if the service request for "Party Entertainment" included a description of "Looking for clowns, magicians, ride operators, and caterers," the match of clowns from the description may cause entity search logic 110 to identify the particular provider account.

In other embodiments, presentation/user interface logic 114 may display an editable text box for typing in one or more keywords to facilitate a search for service provider types that are not displayed. For example, keywords typed into the first text box for the particular provider account may include "Birthday," "Clown," "Party," "Magic," "Dance," "Teacher," "Instructor," and "Music." If requester device 140 searched for "Party Entertainment," the match of "Party" with the "Party" keyword may cause entity search logic 110 to identify the particular provider account.

Entity search logic 110 may weight search results based on number of keywords that match or location of matching keywords. If multiple keywords match from the search request, entity search logic 110 may give an identification of the particular provider a relatively high weight. In contrast, if one keyword matches the search request, entity search logic 110 may give the identification of the particular provider a lower weight. An even lower weight may be given to the identification of the particular provider from matches between the keywords and words in the description of the search request.

In an embodiment, social networking server computer 100 only identifies service providers that live in the same or surrounding geographic regions as the requester. For example, at the creation of each social networking account, social networking server computer 100 may request an address of current residence. Social networking server computer 100 may verify the address of an individual using the last four digits of a social security number. In this manner, social networking server computer 100 protects the integrity of the social networking accounts by limiting the accounts to verifiable individuals. By limiting the identification of service providers to people who live in the same or surrounding geographic regions as the requester, social networking server computer 100 may preserve an inherent trust between community members. For example, a person may be more comfortable hiring a babysitter who lives in the same community than a babysitter who is unknown to the requester and his surrounding neighbors.

At step 206 the service request is sent to one or more second computing devices associated with the one or more second social networking accounts. For example, presentation/user interface logic 114 may send a message to each provider account identified in step 204. For example, presentation/user interface logic 114 may cause a notification to appear on a computing device associated with a provider account when the provider signs into the social networking account. Alternatively and/or additionally, presentation/user interface logic 114 may cause a notification to be pushed to a computing device through an application executing on the computing device. For example, if the computing device is a smartphone, social networking server computer 100 may send a message to an application publisher requesting display of the notification on the computing device. The application publisher may then send a message to the device that causes the operating system executing on the device to display the notification.

Figure 9:
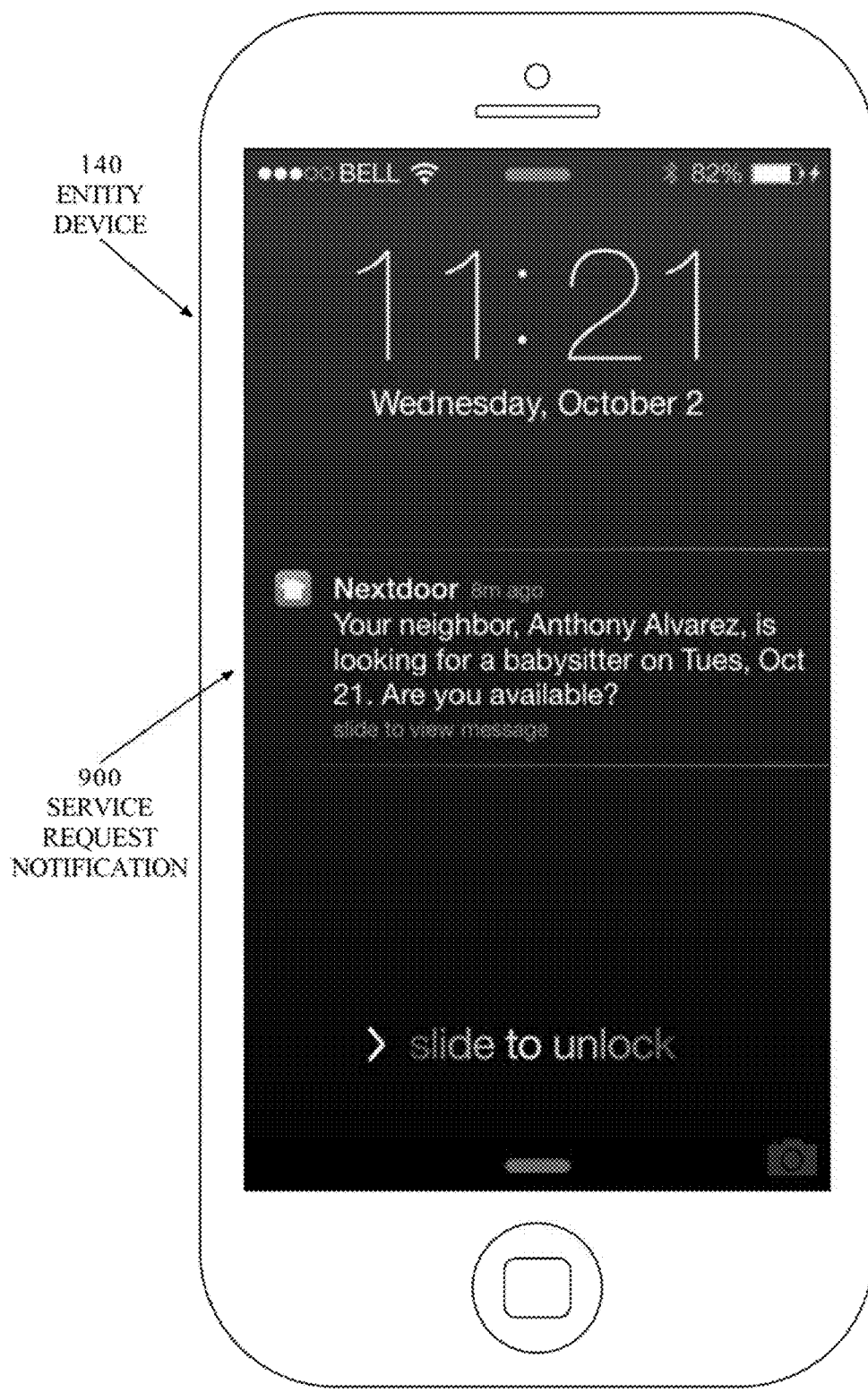
FIG. 9 is an entity computing device displaying an example notification indicating a service request.

FIG. 9 is an entity computing device displaying an example notification indicating a service request. Entity device 140 contains service request notification 900. Service request notification 900 indicates that the first social networking account is searching for a service provider of a particular type. In an embodiment, presentation/user interface logic 114 uses data stored in connection with the first social networking account and data entered into the interfaces used to create the search request to create service request notification 900. For example, service request notification 900 in FIG. 9 contains a name associated with the first social networking account, the type of service requested, and the date of the service request.

In embodiments, service request notification 900 may include more or less data. For example, service request notification 900 may include only the type of service requested and the date of the request. As another example, service request notification 900 may include the elements shown in FIG. 9 and one or more of: the time of the service request, the location of the service request, and additional information associated with the service request, e.g. a number of children and ages of the children for a babysitter request.

In an embodiment, service request notification 900 may include an identification of an application stored on the entity device through which presentation/user interface logic 114 may display the service request. Upon receiving a selection of service request notification 900, an operating system executing on entity device 140 may cause the application to be brought to the foreground of the display of entity device 140 if the application is already running. If the application is not running, the operating system executing on entity device 140 may execute the application and bring it to the foreground of the display of entity device 140. Presentation/user interface logic 114 may then cause display of the service request on entity device 140. In embodiments where the notification is sent to entity device 140 through the already executing application, presentation/user interface logic 114 may cause display of the service request upon receiving a selection of the notification.

In additional embodiments, service request notification 900 may be sent to the service provider through one or more additional means. For example, the service provider may indicate an email address or telephone number for receiving notifications. Presentation/user interface logic 114 may send service request notification 900 through email, SMS messaging, or other electronic communication methods. Service request notification 900 may include a link that identifies an application to execute or includes a uniform resource locator (URL) of a webpage that is hosted by social networking server computer 100. Selection of the link in service request notification 900 may cause the application to execute or a browser to execute and navigate to the webpage identified through the URL.

Figure 10:
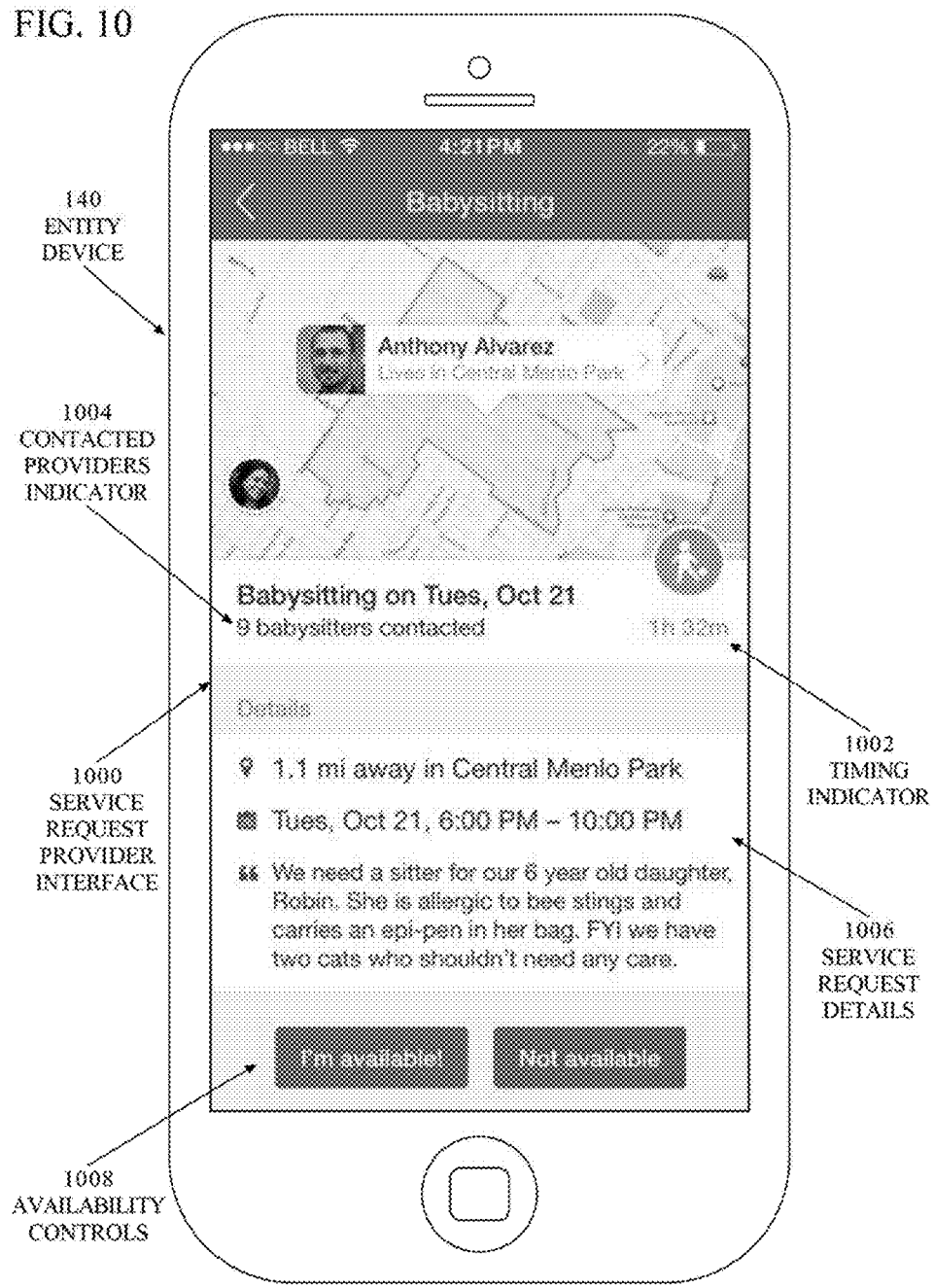
FIG. 10 is an entity computing device displaying an example graphical user interface depicting the service request with additional service request details.

FIG. 10 is an entity computing device displaying an example graphical user interface depicting the service request with additional service request details. Entity device 140 in FIG. 10 displays service request provider interface 1000. Service request provider interface 1000 includes timing indicator 1002, contacted providers indicator 1004, service request details 1006, and availability controls 1008.

Timing indicator 1002 is displayed on service request provider interface 1000 in some embodiments to indicate an amount of time that has passed since the service request has been created. By displaying timing indicator 1002, presentation/user interface logic 114 creates a sense of urgency for a response.

A contacted providers indicator 1004 is displayed in some embodiments to indicate the number of other providers that have been contacted for the service request. In some embodiments, the contacted providers indicator 1004 also indicates a number of providers that have responded with availability to the service request. By displaying both timing indicator 1002 and contacted providers indicator 1004, presentation/user interface logic 114 increases the efficiency of the system by providing an incentive for a faster response.

In an embodiment, service request details 1006 includes information about the service request extracted from data stored in connection with the first social networking account and data entered into the interfaces used to create the search request. In some embodiments, service request details 1006 include additional information that was not displayed in service request notification 900 in FIG. 9. For example, in FIG. 10 service request details 1006 includes the distance between the service provider and the entity and additional information about the service request that was entered into additional information interface 400 of FIG. 4. In embodiments that include the service specific interfaces of FIG. 5 and FIG. 6, the service specific information may be displayed as part of service request details 1006. For example, a separate line in service request details 1006 for a babysitter request may include a child's name and age. As another example, a separate line in service request details 1006 for IT personnel may include the type of computing device and operating system running on the computing device.

In some embodiments, specific information is hidden in service request details 1006 until the user of requester device 130 selects an option to hire the user of entity device 140 for the particular service request. For example, the display of FIG. 10 does not display the address associated with the service request, but instead shows a general area with an indication of the distance between the address associated with entity device 140 and the address associated with requester device 130. In some embodiments, presentation/user interface logic 114 changes service request provider interface 1000 of FIG. 10 to display the previously hidden information, such as the requester's address, when the user of entity device 140 is hired.

In an embodiment, availability controls 1008 provide a user of entity device 140 with options to respond to the service request with an availability response. For example, in FIG. 10, availability controls 1008 include selectable options to indicate that the user of entity device 140 is available to fulfill the service request or unavailable to fulfill the service request. In response to receiving a selection of the "I'm available!" option, social networking server computer 100 may store the availability response. In some embodiments, a selection of the "I'm available!" option causes presentation/user interface logic 114 to cause display of an interface for adding additional information to the response. In response to receiving a selection of the "Not available" option, social networking server computer 100 may store data indicating that the social networking account associated with entity device 140 refused the service request. Presentation/user interface logic 114 may alter service request provider interface 1000 to indicate the response indicated through availability controls 1008. For example, if "I'm available!" is selected, presentation/user interface logic 114 may replace availability controls with "You indicated that you are available."

Sending Service Requests to a Subset of Service Providers

In an embodiment, social networking server computer 100 determines a subset of the identified social networking accounts to which to send the service request. For example, selection/interface generation logic 112 may be configured to initially only send the service request to a predetermined number of social networking accounts. By establishing a maximum number of social networking accounts for the initial sending, social networking server computer 100 raises the chances of receiving positive responses and ensures that the number of positive responses does not overwhelm the user of requester device 130. As another example, selection/interface generation logic 112 may be configured to initially only send the service request to social networking accounts that meet specific criteria.

After social networking server computer 100 sends the service request to the subset of the second one or more computing devices, social networking server computer 100 may wait for a pre-established event to occur before sending the service request to a second subset of the second one or more computing devices. In an embodiment, the pre-established event is a receipt of a minimum number of negative responses. For example, if social networking server computer 100 initially sends the service request to ten computing devices, social networking server computer 100 may wait until it receives five negative responses before sending the service request to the next ten computing devices.

In an embodiment, the pre-established event is the passage of a set period of time. For example, social networking server computer 100 may wait an hour after it sends the service request to the first ten computing devices before sending the service request to the next ten computing devices. In an embodiment, the pre-established event is a combination of the above discussed pre-established events. For example, social networking server computer 100 may send the service request to the second ten computing devices after receiving five rejections or determining that an hour has passed since the sending of the service request to the first ten computing devices.

In some embodiments, the occurrence of the pre-established event is conditional. For example, the pre-established event may be a passage of a set period of time without receiving a minimum number of positive responses. For example, if social networking server computer 100 determines that an hour has passed since the sending of the service request to the first ten computing devices, but that eight of the computing devices have sent availability responses, social networking server computer 100 may not send the request to the second subset of computing devices.

In situations where the pre-established event is conditional, such as in the above example, social networking server computer 100 may wait for a second pre-established event before sending the service request to the second subset of computing devices. For example, social networking server computer 100 may wait until it has received a veto from the requester device for the eight computing devices that sent availability responses before sending the service request to the second subset of computing devices.

In some embodiments, the second subset of computing devices is identified to comprise the same number of computing devices as the first subset. For example, in the above examples the first subset of computing devices comprises ten computing devices and the second subset of computing devices comprises ten computing devices. In other embodiments, the second subset of computing devices is determined based on different criteria than the first subset. For example, the first subset of computing devices may be identified by previous relationships with the requester device while the second subset of computing devices is identified as associated with entities which have received one or more recommendations. Any combination of the criteria described in the following paragraphs may be used to determine a first subset of computing devices and subsequent subsets of computing devices. In an embodiment, the second subset of computing devices comprises the remainder of the computing devices after the first subset of computing devices has been removed.

Selection/interface generation logic 112 may use one or more criteria to determine the first subset of computing devices. The one or more criteria may be any combination of entities preferred by the user of the requester device, entities that meet one or more preferences of the requester device, responsive entities, recommended entities, geographically convenient entities, entities that have received special dispensation, and entities that do not have other known obligations.

The one or more criteria may be hierarchical, such that social networking accounts that meet a first combination of criteria comprise a first level of social networking accounts; social networking accounts that meet a second combination of criteria comprise a second level of social networking accounts; and so on. For example, social networking accounts that are preferred by the user of the requester device and have no other known obligations at the time of the request may comprise the first level of social networking accounts. Social networking accounts that meet one or more preferences of the requester device, are responsive entities, and have no other known obligations may comprise the second level of social networking accounts.

In an embodiment where a set number of computing devices are selected as the first subset of computing devices, the set number of computing devices may be selected from computing devices associated with social networking accounts in the top levels of social networking accounts. For example, social networking server computer 100 may be configured to send the service request to ten computing devices. If a first level of social networking accounts includes two social networking accounts, a second level includes five social networking accounts, and a third level includes six social networking accounts, social networking server computer 100 may send the service request to all of the computing devices associated with the social networking accounts in the first and second level and to three of the computing devices associated with social networking accounts in the third level. In an embodiment where social networking server computer does not identify the first subset of computing devices based on a set number, social networking server computer may identify all of the computing devices associated with social networking accounts within one or more top levels as the first subset computing devices.

In some embodiments, social networking server computer 100 is configured to send the service request to either a minimum or maximum number of computing devices. For example, social networking server computer 100 may be configured to send the service request to a minimum of eight computing devices. In the above level example, social networking server computer 100 may send the service request to the computers associated with social networking accounts in all three identified levels because it would not reach the minimum of eight computing devices with the two social networking accounts in the first level and the five social networking accounts in the second level. If, as an alternate example, social networking server computer 100 is configured to send the service request to a maximum of eight computing device, social networking server computer 100 may send the service request to the computing devices associated with social networking accounts in the first two levels because it would surpass the maximum of eight devices if it included the devices associated with social networking accounts in the third level.

One criterion for identifying a subset of the one or more second computing devices is whether the computing devices are associated with social networking accounts that are preferred entities of the social networking account associated with requester device 130. Preferred entities may include entities that have a previous relationship with the social networking account associated with the requester device. For example, if Anthony hired Rosa as a babysitter through social networking server computer 100 in the past, Rosa may be included as a preferred entity. In an embodiment, the preferred entities are limited to entities that have previously been recommended by the social networking account associated with the requester device. For example, if Anthony hired Rosa and Emily as babysitters through social networking server computer 100 in the past, but only recommended Rosa, Rosa may be considered a preferred entity and Emily may not be considered a preferred entity. In some embodiments, preferred entities may be customized through the social networking account associated with requester device. For example, social networking server computer 100 may generate a separate interface for listing preferred entities. Through the separate interface, Anthony may indicate that Rosa and Emily are preferred entities.

A second criterion for identifying a subset of the one or more second computing devices is whether the computing devices meet one or more preferences of the social networking account associated with requester device. The one or more preferences may include information entered into the interfaces for creating the service request. For example, Anthony may list three children between the ages of two and five through the interfaces of FIG. 5 and FIG. 6. Social networking server computer 100 may determine that data associated with Rosa's social networking account indicates that Rosa has experience dealing with young children while data associated with Emily's account indicates that Emily has experience dealing with older children.

In the above example, the data may be extracted from past babysitting jobs taken by Rosa and Emily or from past babysitting jobs refused by Rosa and Emily. Additionally and/or alternatively, social networking server computer 100 may provide an interface for Rosa and Emily to input the types of children with which they tend to work. As another example, if Rosa tends to refuse service requests for Saturday nights, Rosa may not be included in the first subset for service requests that list a Saturday night as the time for the service request. Preferences may also be extracted from past hiring decisions made by the user of the social networking account associated with requester device 130. For example, if Anthony continually selects babysitters that list "board games" in their response messages, selection/interface generation logic 112 may identify other babysitters that have listed "board games" in their past response messages.

A third criterion for identifying a subset of the one or more second computing devices is responsiveness data for the subset of the one or more second computing devices. Responsiveness data may be extracted from past interactions between the one or more second computing devices and social networking server computer 100. For example, if Rosa frequently does not respond to service requests within an hour of receiving the service request or frequently responds as unavailable for service requests, social networking server computer 100 may store that information as responsiveness data for Rosa. Selection/interface generation logic 112 may identify entities that meet a threshold level of responsiveness or rank the entities based on the level of responsiveness. In an embodiment, entities that tend to not respond or tend to respond after a long delay are treated as less responsive than entities that frequently respond quickly as unavailable. Thus, the entities that respond quickly may receive more service requests and entities that respond positively more often may also receive more service requests.

A fourth criterion for identifying a subset of the one or more second computing devices is recommendations received by social networking server computer 100 for social networking accounts associated with the computing device. For example, social networking server computer 100 may provide a capability for a user to provide a recommendation for a service provider for a particular type of service. Thus, recommendations for Rosa as a party clown may not factor into the fourth criterion when the service request indicates a search for a babysitter. In some embodiments, the fourth criterion may be met by a service provider having received a threshold number of recommendations.

In other embodiments, selection/interface generation logic 112 may rank the entities by the number of recommendations for the entity. The recommendations themselves may also be ranked by relevance of the recommendations. For example, if Anthony listed three children between the ages of two and five in his search request, recommendations for service providers that originate from service requests identifying younger children may be ranked as more relevant than recommendations for service providers that originate from service requests identifying teenagers. Thus, if Rosa received a recommendation for her prior work babysitting a three year old, the recommendation may be ranked higher than a recommendation Emily received for her prior work babysitting a thirteen year old.

A fifth criterion for identifying a subset of the one or more second computing devices is requests from the service provider accounts. For example, Rosa may send a request to social networking server computer 100 for more babysitter service requests while Emily may send a request to social networking server computer 100 to receive less babysitter service requests. Selection/interface generation logic may identify Rosa as having requested more service requests and include Rosa in the first subset while Emily may be included in the second subset. In an embodiment, social networking server computer 100 may provide controls for indicating a type of service request for the service providers to request.

For example, controls may be available to request an increased number of service requests for specific days of the week or for specific age ranges of children. Additionally and/or alternatively, social networking server computer 100 may provide the option for service providers to become preferred members. Preferred members may receive service requests before the remaining members. In other embodiments, social networking server computer 100 may provide an option for a service provider to pay to receive service requests before remaining members or to receive service requests more frequently.

In an embodiment, selection/interface generation logic 112 determines the availability of the user of the social networking account before sending the service request. Selection/interface generation logic may identify other accepted service requests by the social networking account associated with the computing device to determine if the dates and times for the accepted service requests overlap with the current service request. For example, if Rosa has accepted a service request for Tuesday at 6 pm-8 pm, Rosa would be unavailable to accept a service request for Tuesday at 7 pm-9 pm. Thus, social networking server computer 100 may not send the service request to Rosa's computing device because she is unavailable. By removing social networking accounts that have already accepted service requests for overlapping times, social networking server computer 100 increases the efficiency with which the user of requester device 130 may find an available service provider.

Additionally, social networking server computer 100 incentivizes the completion of the hiring process through the system because it decreases the likelihood that the user of entity device 140 will receive requests for times when the user of entity device 140 is unavailable. Decreasing the likelihood that the service provider will receive requests with overlapping times will also by default decrease the percentage of times that the service provider must decline a request, thereby increasing the responsiveness for the service provider.

Referring back to FIG. 2, at step 208 an availability response is received from a particular computing device associated with a particular social networking account. For example, a user of entity device 140 may select the "I'm available" response of availability controls 1008 in FIG. 10. In response to receiving an indication of the availability response, presentation/user interface logic 114 may display a graphical user interface for starting a conversation flow between the user of requester device 130 and the user of entity device 140. The conversation flow allows the user of requester device 130 and the user of entity device 140 to discuss terms of the arrangement through the social networking system.

Figure 11:
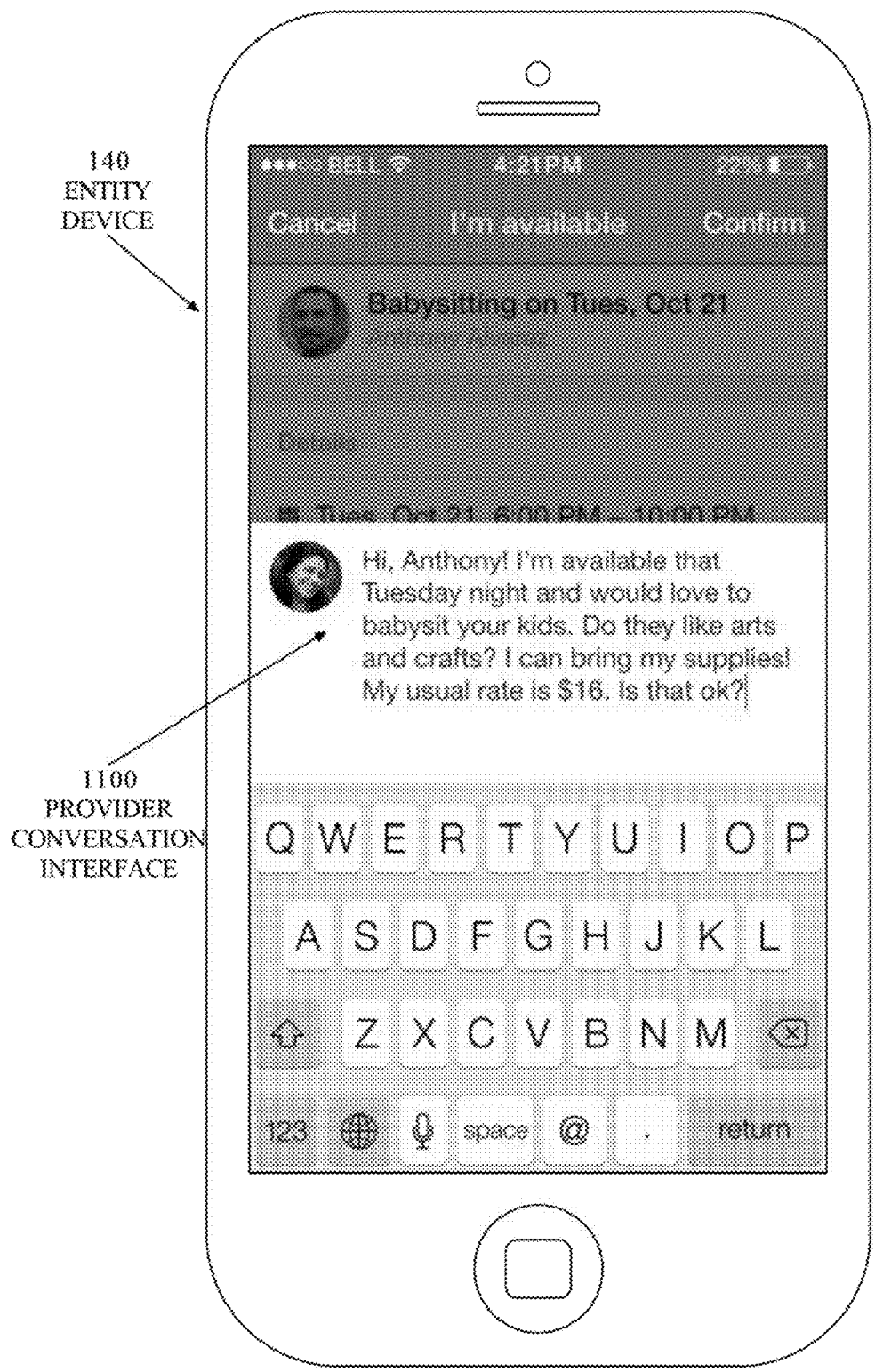
FIG. 11 is an entity computing device displaying an example graphical user interface with controls for adding additional information to an availability response to a service request.

FIG. 11 is an entity computing device displaying an example graphical user interface with controls for adding additional information to an availability response to a service request. Entity device 140 in FIG. 11 contains provider conversation interface 1100. Provider conversation interface 1100 includes an editable text box through which the service provider may enter additional information that may be sent along with the availability data. In an embodiment, presentation/user interface logic 114 may be configured to not display provider conversation interface 1100 after receiving an availability selection if the service provider has previously been hired by the requester. For example, if Rosa has been hired for past babysitting jobs with Anthony, an introductory message may not be necessary. Additionally and/or alternatively, presentation/user interface logic 114 may display an option for the user of entity device 140 to include a message if a prior relationship is detected.

In some embodiments, the availability response may complete the transaction between the requester and the service provider. In one embodiment, presentation/user interface logic 114 may initially display an option for the user of requester device to send a pre-accepted service request to a list of preferred entities. For example, Anthony may indicate that, due to past dealings with Rosa and Emily, he would happily accept either babysitter to watch his children. Social networking server computer 100 may store the list of preferred entities in connection with the first social networking account. Anthony may then select an option to send a pre-accepted service request to the entities on the list of preferred entities. The service request may identify itself to the preferred entities as a pre-accepted service request, such that the first preferred entity to select the "I'm available" option completes the transaction and is hired for the specific service request. In response to receiving an "I'm available" response, social networking server computer may cancel the service request to the other service providers and send a message to requester device 130 indicating that the particular service provider has accepted the service request.

In an embodiment, social networking server computer 100 identifies requests that receive an uncharacteristically low number of positive responses. For example, if a service request either receives an extremely low number of responses or receives mostly negative responses, social networking server computer 100 may store data indicating that the service request received an uncharacteristically low number of positive responses. In response to storing data indicating that the service request received an uncharacteristically low number of positive responses, social networking server computer 100 may send a message to an administrative computing device indicating that something may be wrong with the service request. The administrative computing device may comprise controls for removing the service request, sending a message to the service requester, or banning and/or suspending the account of the service requester.

In an embodiment, in response to receiving an unavailable response or absence of a response from an entity device, social networking server computer 100 stores data identifying the social networking account associated with the entity device and indicating that the social networking account was unavailable for the service request. Social networking server computer 100 may identify computing devices that consistently turn down service requests and store data indicating the lack of positive responses from the computing devices.

Additionally, social networking server computer 100 may identify certain types of service requests that are consistently refused by an entity device. For example, if Rosa consistently refuses requests to babysit children above the age of eight, to babysit children on Saturday nights, or to babysit children in certain neighborhoods, social networking server computer 100 may store data indicating the repeated refusals. In an embodiment, social networking server computer 100 may refrain from sending Rosa babysitting requests that match her past refusals. In another embodiment, social networking server computer 100 may remove Rosa from the first subset of computing devices, but still send the service request to her as one of the second subset of computing devices or latter subsets of computing devices.

Sending Availability Responses to Requester

Referring to FIG. 2, at step 210 an availability response is sent to the first computing device. The availability response may be sent to the first computing device in a similar manner as the service request was sent to the entity computing devices. Presentation/user interface logic 114 may send a message to the requester social networking account or may send a message directly to the requester through email or SMS messaging. For example, presentation/user interface logic 114 may cause a notification to appear on requester device 130 when the requester signs into the social networking account. Alternatively and/or additionally, presentation/user interface logic 114 may cause a notification to be pushed to requester device 130 through an application executing on requester device 130. For example, if requester device 130 is a smartphone, social networking server computer 100 may send a message to an application publisher requesting display of the notification on requester device 130. The application publisher may then send a message to requester device 130 that causes the operating system executing on requester device 130 to display the notification.

Figure 12:
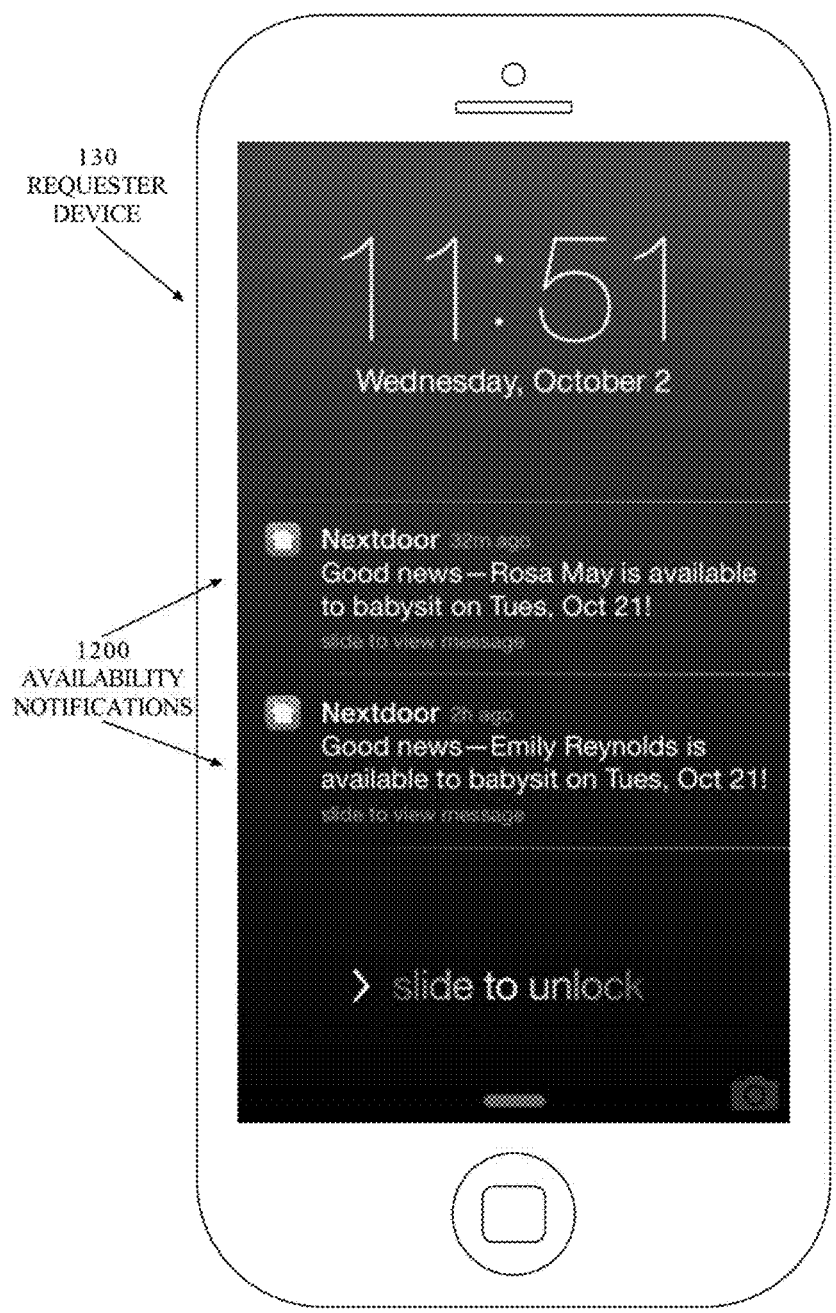
FIG. 12 is a requester computing device displaying an example notification indicating an availability response to fulfill the service request from one or more service providers.

FIG. 12 is a requester computing device displaying an example notification indicating an availability response to fulfill the service request from one or more service providers. Requester device 130 includes availability notifications 1200. Availability notifications 1200 indicate an availability of the identified service providers to fulfill the service request. In an embodiment, presentation/user interface logic 114 uses data stored in connection with the one or more second social networking accounts and data entered into the interfaces used to respond to the search request to create availability notifications 1200. For example, availability notifications 1200 include a name associated with the one or more second social networking accounts, the type service of service requested, the date of the service request, and an indication that the provider is available to fulfill the service request. In embodiments, availability notifications 1200 may include more or less data. For example, availability notifications 1200 may simply state that one or more service providers have responded that they are available to fulfill the service request. As another example, availability notifications 1200 may include the elements shown in FIG. 12 and one or more of: the time of the service request, the location of the service request, and additional information associated with the response, e.g. an indication of how much the service provider would charge for completing the service request.

In an embodiment, availability notifications 1200 may include an identification of an application stored on requester device 130 through which presentation/user interface logic 114 may display the availability response. Upon receiving a selection of a particular notification of availability notifications 1200, an operating system executing on requester device 130 may cause the application to be brought to the foreground of the display of requester device 130 if the application is already running. If the application is not running, the operating system executing on requester device 130 may execute the application and bring it to the foreground of the display of requester device 130. Presentation/user interface logic 114 may then cause display of the availability response on requester device 130. In embodiments where the notification is sent to requester device 130 through the already executing application, presentation/user interface logic 114 may cause display of the availability response upon receiving a selection of the notification.

Figure 13:
FIG. 13 is a requester computing device displaying an example graphical user interface depicting a profile of a service provider.

In an embodiment, the availability response may include an identification of the service provider, a message generated by the service provider through an interface such as provider conversation interface 1100 of FIG. 11, and a link to a profile of the service provider. Upon receiving a selection of the link, presentation/user interface logic 114 may cause display of the profile of the service provider on requester device 130. FIG. 13 is a requester computing device displaying an example graphical user interface depicting a profile of a service provider. Requester device 130 in FIG. 13 contains entity profile interface 1300. In an embodiment, entity profile interface 1300 includes entity recommendations 1302. Entity recommendations 1302 may comprise recommendations made for the particular service provider through prior hiring interactions and/or recommendations created directly through a recommendation interface displayed in association with the service provider's profile. Entity profile interface 1300 may also comprise additional data input by the service provider, such as the service provider's specialties, preferences, biographical information, and interests, and additional data generated by social networking server computer 100 about the service provider, such as a number of prior jobs accepted by the service provider.

In an embodiment, entity profile interface 1300 is separately generated based on the viewer of entity profile interface. Selection/interface generation logic 112 may be configured to identify the social networking account of the computing device used to access entity profile interface 1300. If the social networking account of the computing device used to access entity profile interface 1300 is associated with an active service request that has received an availability response from the provider social networking account associated with entity profile interface 1300, selection/interface generation logic 112 may generate entity profile interface 1300 to be relevant to the service request. For example, if Rosa has received recommendations as a babysitter and as a party clown, selection/interface generation logic 112 may generate entity profile interface 1300 with recommendations for Rosa as a babysitter in response to determining that the viewer of Rosa's profile has an open request for a babysitter.

In contrast, if a second viewer of Rosa's profile has an open request for a party clown, selection/interface generation logic 112 may generate entity profile interface with recommendations for Rosa as a party clown. In some embodiments, selection/interface generation logic 112 also filters the recommendations for the service provider by the likely relevance to the viewer. For example, if Anthony identified children between the ages of two and five in his service request, selection/interface generation logic 112 may display recommendations for Rosa as a babysitter that relate to prior transactions where Rosa babysat for young children instead of recommendations for Rosa as a babysitter that relate to prior transactions where Rosa babysat for teenagers. Additionally, if Anthony mentioned "arts and crafts" in his service request, selection/interface generation logic 112 may identify recommendations for Rosa that also mentioned "arts and crafts" and feature those recommendations in entity profile interface 1300.

Referring to FIG. 2, at step 212 hire input is received from the first computing device for the particular social networking account. For example, social networking server computer 100 may display an option for responding to the availability response below the availability response. In some embodiments, social networking server computer 100 also displays the option for responding to the availability response on the entity profile when viewed by requester device 130. In an embodiment, presentation/user interface logic 114 is configured to request a type of availability response in response to receiving a selection of the option to respond to the availability response. In other embodiments, the option to respond to the availability response includes options to hire the service provider, reply to the service provider, and/or turn down the service provider.

Figure 14:
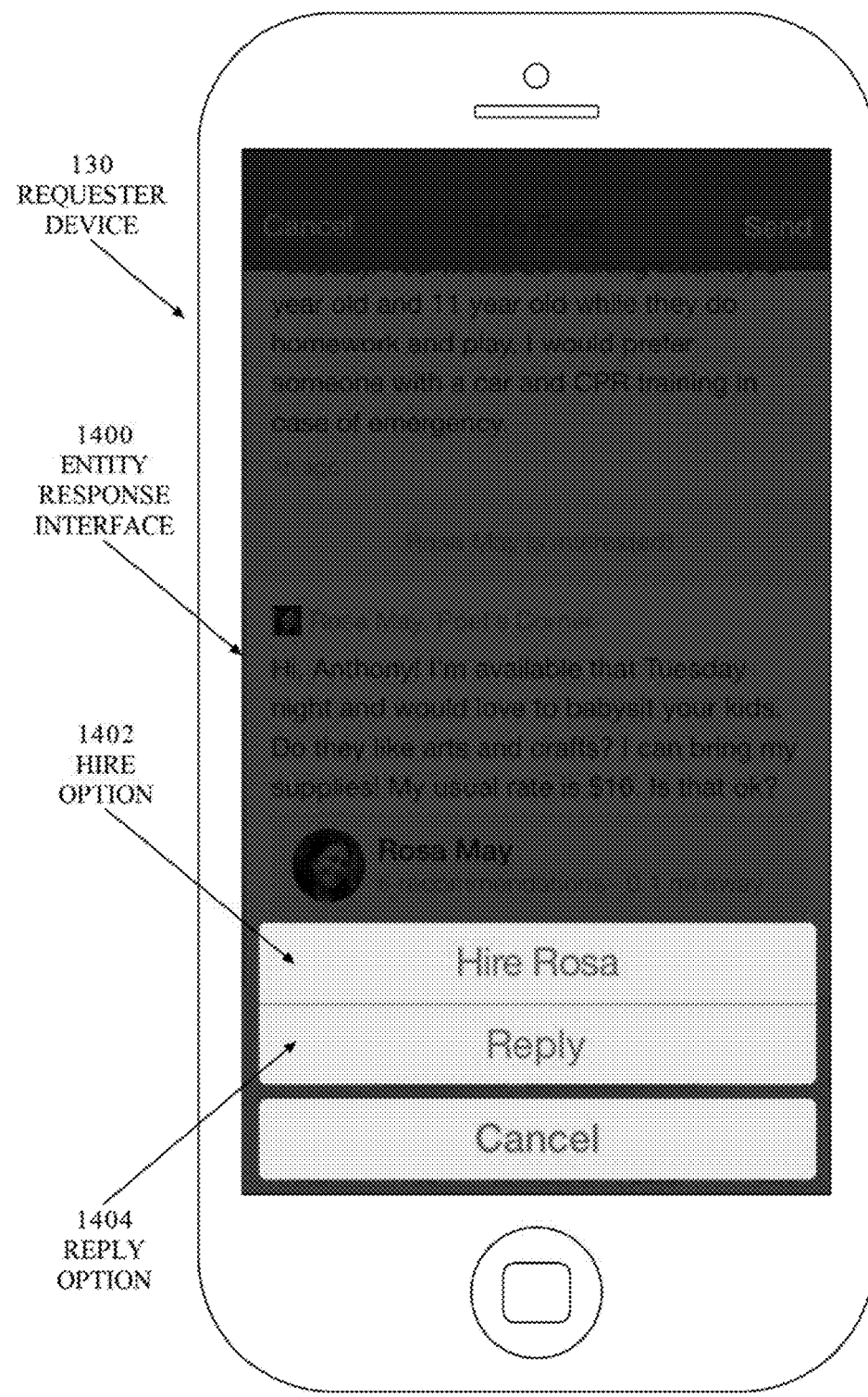
FIG. 14 is a requester computing device displaying an example graphical user interface with controls for responding to an availability response.

FIG. 14 is a requester computing device displaying an example graphical user interface with controls for responding to an availability response. Requester device 130 in FIG. 14 displays hire option 1402 and reply option 1404 over entity response interface 1400. In response to receiving a selection of hire option 1402, presentation/user interface logic 114 may send a message to entity device 140 indicating that the service provider has been hired for the particular service request. In an embodiment, in response to receiving a selection of hire option 1402, presentation/user interface logic 114 displays controls for creating a message to send along with the reply response. In some embodiments, presentation/user interface logic 114 may automatically display the controls for creating a message to send along with the reply response unless presentation/user interface logic 114 determines that the requester and service provider have had prior transactions. For example, if Anthony has hired Rosa for babysitting in the past, Anthony's selection to hire Rosa for the particular service request may not cause display of the controls to send a message along with the response while Anthony's selection to hire someone he has not worked with in the past may cause display of the controls to send a message along with the response. In response to receiving a selection of reply option 1404, presentation/user interface logic 114 may display controls for responding to the availability response without hiring the particular service provider. By providing the reply option, social networking server computer 114 creates a means for opening communication between the requester and service provider before the requester decides to hire the service provider.

Figure 15:
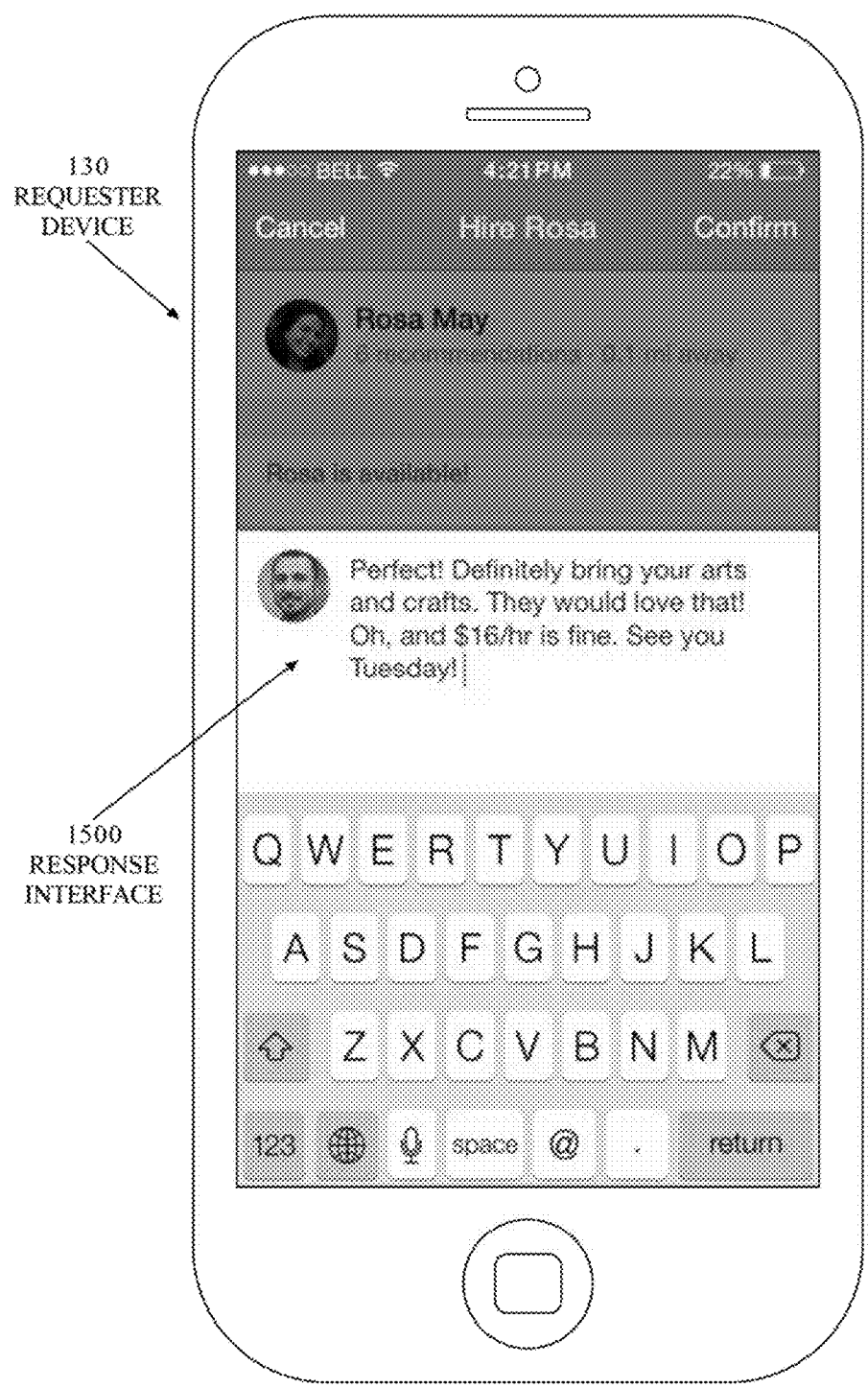
FIG. 15 is a requester computing device displaying an example graphical user interface with controls for adding additional information to a hire selection.

FIG. 15 is a requester computing device displaying an example graphical user interface with controls for adding additional information to a hire selection. Requester device 130 in FIG. 5 includes response interface 1500. Response interface 1500 includes controls for creating a reply to go along with a hire notification that is sent to entity device 140. A similar interface as response interface 1500 may be provided for sending a reply without hiring the particular service provider.

Sending Hired Selection to Particular Service Provider

Figure 16:
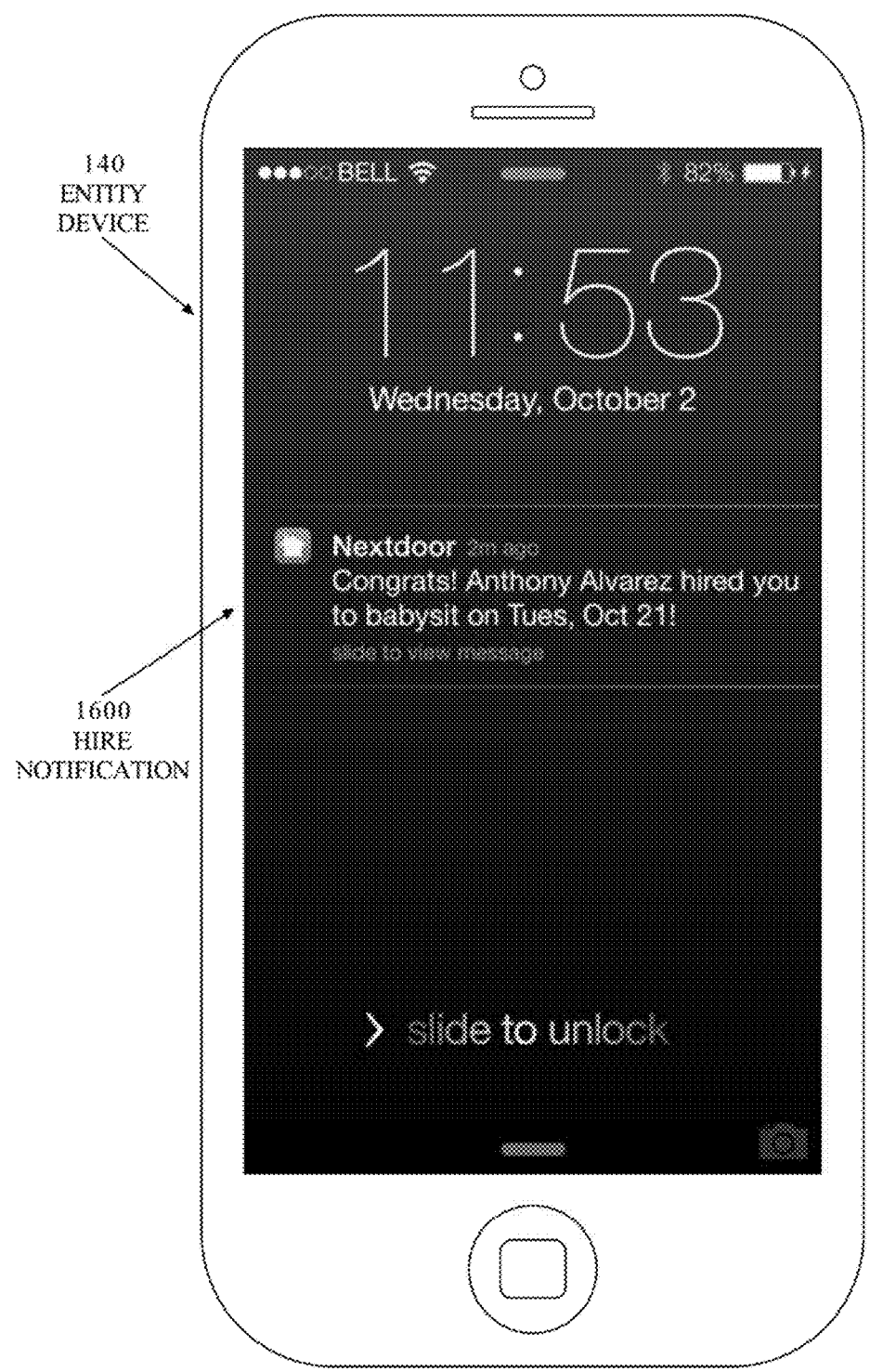
FIG. 16 is an entity computing device displaying an example notification indicating a hire selection for the service request.

At step 214, a notification is sent to the particular computing device indicating the hire input for the particular social networking account. FIG. 16 is an entity computing device displaying an example notification indicating a hire selection for the service request. Entity device 140 includes hire notification 1600. Hire notification 1600 indicates that the service provider associated with entity device 140 has been hired to fulfill the particular service request. Notifications may be created and displayed on entity device 140 using any of the methods described above. In an embodiment, in response to receiving a selection of hire notification 1600, presentation/user interface logic 114 causes display of the message generated through response interface 1500 of FIG. 5. Presentation/user interface logic 114 may also cause display of the initial service request. In an embodiment, the displayed initial service request includes additional details, such as the address associated with the service request.

In an embodiment, presentation/user interface logic 114 also sends a message to the service providers that were not hired for the service request. In an embodiment, presentation/user interface logic only sends the message to service providers that initially indicated that they were available for the service request. Presentation/user interface logic 114 may also update the service request interface to indicate that the service request has been accepted by another service provider. In some embodiments, presentation/user interface logic 114 does not display the service request to other service providers after the particular service provider has been hired to fulfill the service request. For example, if Emily selected the service request notification after Anthony selected the option to hire Rosa, presentation/user interface logic 114 may cause display of a message on Emily's computing device that states that the service request is no longer available.

In an embodiment, presentation/user interface logic 114 may display an option to pay the service provider through one or more electronic payment services on requester device 130. For example, the service provider associated with entity device 140 may associate a payment receipt account with the service provider's profile, such as VENMO, DWOLLA, PAYPAL, or other electronic methods of receiving payment. Presentation/user interface logic 114 may display an option with the service request on requester device 130 to input a payment method for paying the service provider. In an embodiment, presentation/user interface logic 114 displays the option with the service request whenever requester device accesses the service request, thereby ensuring that the requester has the ability to pay the service provider before, during, or after the completion of the service request. In some embodiments, presentation/user interface logic causes display of the payment option on requester device 130 after the time period specified in the service request has passed.

Additional Embodiments

In some embodiments, a price term for the service request is left to the requester and service provider to negotiate independent of the system and methods described herein. In other embodiments, various interfaces may include options for setting the price of service requests or offered prices for completing service requests. In an embodiment, the service request generation interfaces include an option to specify a maximum amount that the requester is willing to spend on the service request. The maximum amount may be displayed to service providers along with the service request.

In an embodiment, service providers may be filtered by a minimum amount the service providers charge for the type of service requested. For example, Anthony may do a search for babysitters that charge a maximum of $20 an hour. If Emily selected a minimum cost of $25 an hour for babysitting for her profile, the service request may not be sent to Emily initially. As another example, if Emily consistently charges $25 for babysitting, the service request may not be sent to Emily initially.

In an embodiment, the availability interface includes an option to select a price value for fulfilling the service request. The availability response may be sent to the service requester with the proposed price. By providing the price value on the availability response interface, social networking server computer 100 provides the opportunity for different service providers to bid on a service request. In some embodiments, the requester is provided with an interface for inputting a counteroffer if the price term is not satisfactory. The final agreed upon price term may be stored in connection with the service request. In some embodiments, the final agreed upon price term is used to auto-complete a price term in a payment interface.

Figure 17:
FIG. 17 is an entity computing device displaying an example notification indicating that a time associated with the service request is approaching.

In an embodiment, a notification is sent to the service provider's computing device to indicate that the time of the service request is approaching. FIG. 17 is an entity computing device displaying an example notification indicating that a time associated with the service request is approaching. Entity device 140 in FIG. 17 includes service request reminder 1700. Service request reminder may indicate that the agreed upon time and date for the service request is approaching. Presentation/user interface logic 114 may be configured to cause display of service request reminder 1700 a specified period of time before the service request. For example, in FIG. 17, service request reminder 1700 is displayed at 4:00 pm for a babysitting job that starts at 6:00 pm. In some embodiments, the period of time for the reminder is configurable by the service provider. For example, the service provider may set a three hour reminder instead of a two hour reminder.

Figure 18:
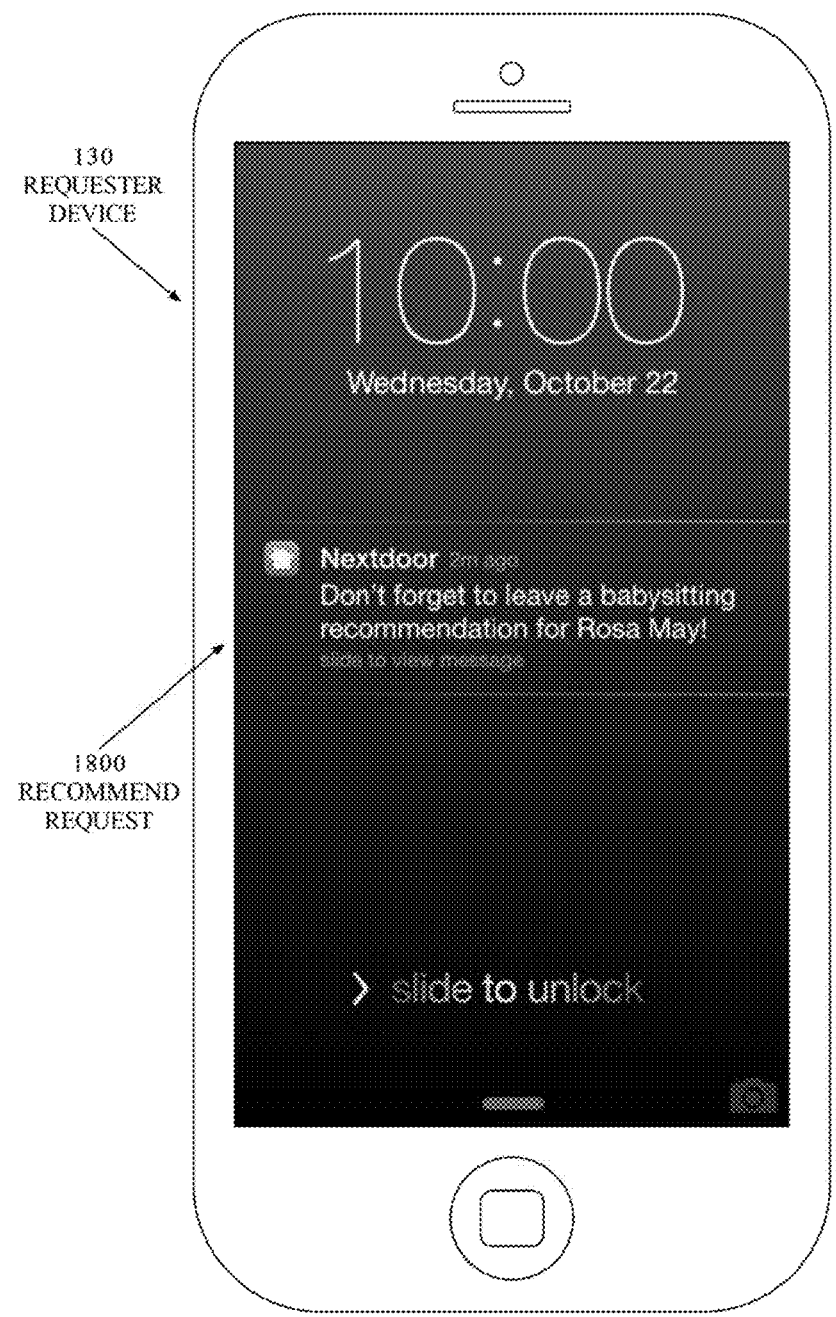
FIG. 18 is a requester computing device displaying an example notification indicating a request for a recommendation for the particular social networking account.

In an embodiment, presentation/user interface logic 114 provides controls for creating a recommendation of the service provider on requester device 130. FIG. 18 is a requester computing device displaying an example notification indicating a request for a recommendation for the particular social networking account. Requester device 130 in FIG. 18 includes recommend request 1800. In an embodiment, presentation/user interface logic 114 displays recommend request 1800 at the end time of the service request. For example, if a babysitting job was scheduled for 6 pm-10 pm, presentation/user interface logic 114 may cause display of recommend request 1800 at 10 pm.

In other embodiments, presentation/user interface logic 114 displays recommend request 1800 a set period of time, such as an hour, after the service request is schedule to end. In even further embodiments, presentation/user interface logic 114 is configured to display recommend request 1800 in response to one or more events. For example, if Anthony pays Rosa through an electronic payment system linked to the service request, presentation/user interface logic 114 may cause display of recommend request 1800 after the completion of the payment transaction.

Figure 19:
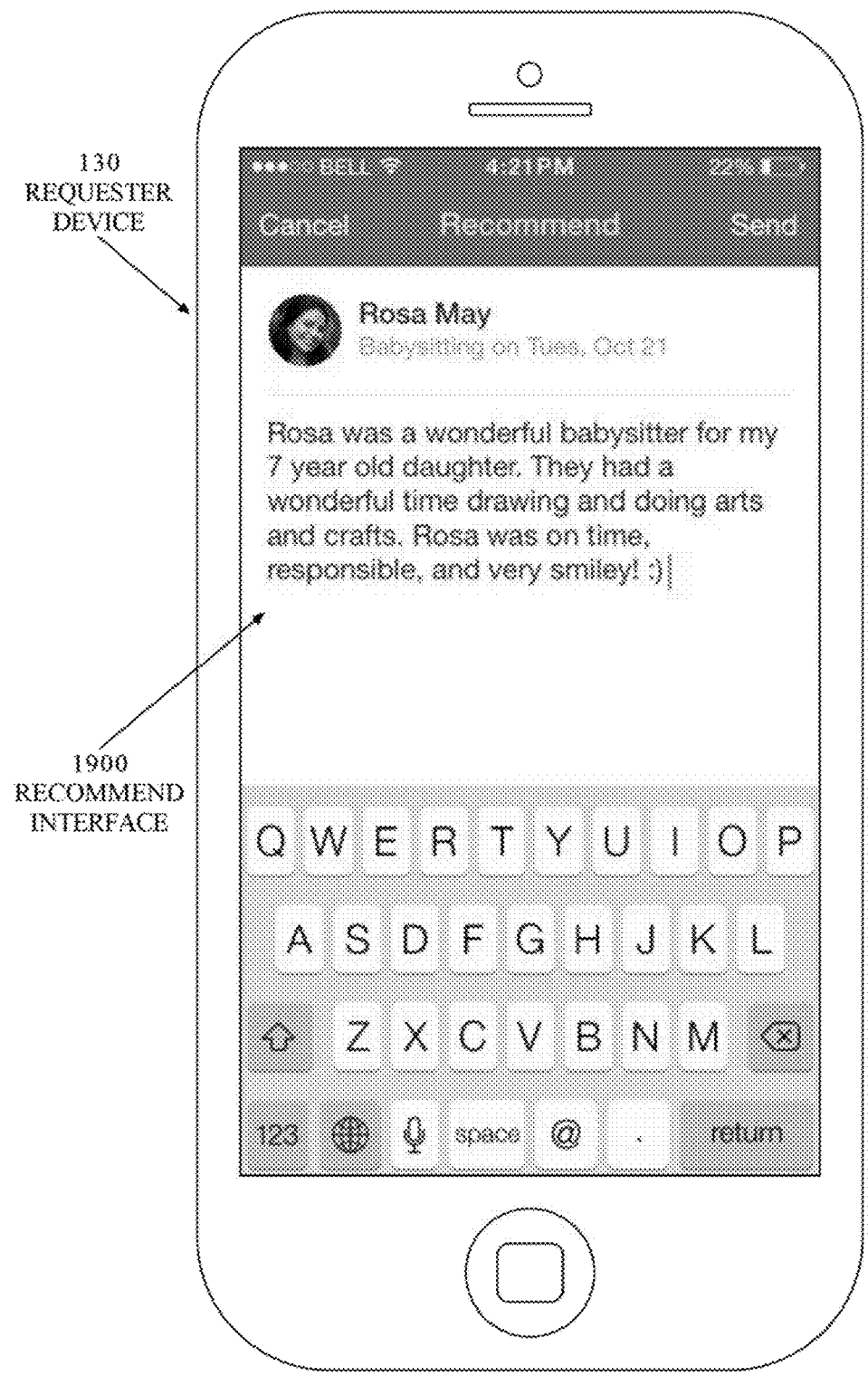
FIG. 19 is a requester computing device displaying an example graphical user interface with controls for creating a recommendation for the particular social networking account.

In response to receiving a selection of recommend request 1800, presentation/user interface logic 114 may cause display of controls for generating a recommendation for the service provider. FIG. 19 is a requester computing device displaying an example graphical user interface with controls for creating a recommendation for the particular social networking account. Requester device 130 in FIG. 19 contains recommend interface 1900. Recommend interface 1900 contains controls for creating a recommendation for a particular service provider. The controls in recommend interface 1900 may include an editable text box for typing in comments. Additionally, the controls may include a rating scale for rating the particular entity. In some embodiments, recommend interface 1900 contains controls for indicating a recommendation or no recommendation for the entity and controls for marking the entity as a preferred entity. Upon receiving an indication that the recommendation has been completed, presentation/user interface logic 114 may store the recommendation in association with the service provider profile. The recommendation may be displayed on the service provider profile to other viewers. A notification may also be sent to the computing device of the service provider to indicate that the service provider received a new recommendation.

In an embodiment, presentation/user interface logic 114 provides controls for browsing through service providers of a particular service type before sending a service request. For example, presentation/user interface logic 114 may cause display of a browse feature on requester device 130. The browse feature may include a search bar or drop down list of service types. Upon receiving a selection of a particular service type, presentation/user interface logic 114 may cause display of one or more service providers that offer services of the particular service type within the geographic region associated with requester device 130.

Presentation/user interface logic 114 may provide controls for viewing additional information associated with the displayed service providers. For example, upon receiving a selection of a particular service provider, presentation/user interface logic 114 may cause display of a profile for the particular service provider. Additionally, presentation/user interface logic 114 may provide controls for selecting one or more of the displayed service providers as a first subset of service providers. For example, if Anthony selected "Babysitters" through the browse feature, presentation/user interface logic 114 may cause display of a list of babysitters on Anthony's device. Each babysitter may be displayed with an option to send a service request to that babysitter or to add the babysitter to a list of babysitters to initially receive the service request.

In an embodiment, service providers selected through the browse feature comprise a first subset of babysitters. For example, presentation/user interface logic 114 may display an option to give preferential treatment to service providers selected through the browse feature. In an embodiment, after occurrence of a pre-established event, social networking server computer 100 may send the service request to all or a subset of the service providers that were not selected through the browse feature.

In an embodiment, social networking server computer 100 waits for authorization before sending the service request to a second subset. For example, upon receiving an unavailable response from Rosa, presentation/user interface logic 114 may send a message to Anthony that reads "Rosa is unavailable to accept your babysitting request. Would you like to send the babysitting request to other babysitters in your area?" In some embodiments, in response to receiving a request to send the service request to a second subset of service providers, presentation/user interface logic 114 causes display of the browse feature on requester device 130. Additionally, and or alternatively, selection/interface generation logic 112 may select the second subset of service providers using the techniques described above.

In additional embodiments, presentation/user interface logic 114 may provide controls for selecting service providers for any number of subsets of service requests. For example, Anthony may select Rosa to initially receive the service request, select other babysitters with which he has worked to receive the service request after Rosa, and select babysitters with the most recommendations as a third subset.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 20:
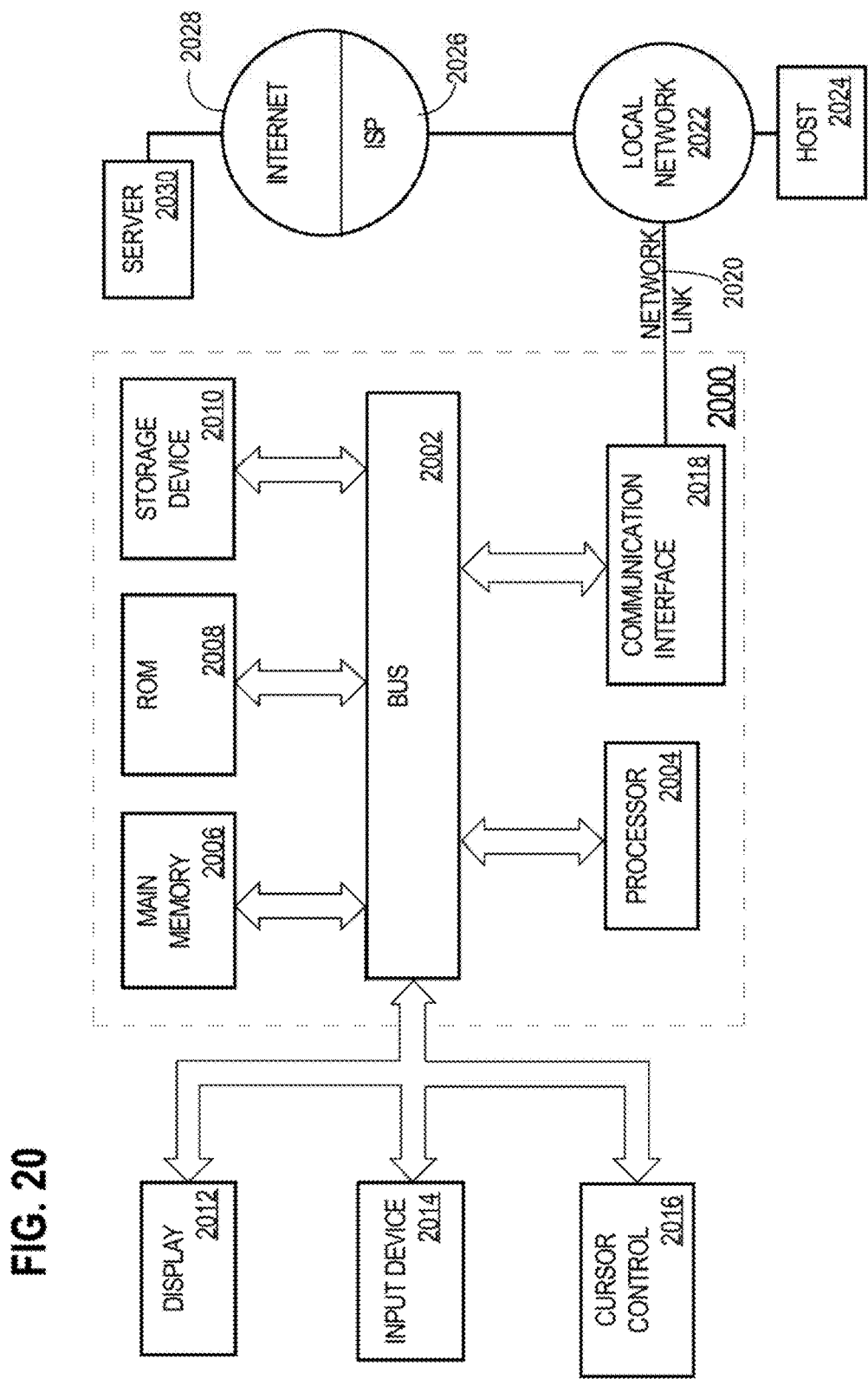
FIG. 20 is a block diagram that illustrates a computer system 2000 upon which an embodiment may be implemented.

For example, FIG. 20 is a block diagram that illustrates a computer system 2000 upon which an embodiment may be implemented. Computer system 2000 includes a bus 2002 or other communication mechanism for communicating information, and a hardware processor 2004 coupled with bus 2002 for processing information. Hardware processor 2004 may be, for example, a general purpose microprocessor.

Computer system 2000 also includes a main memory 2006, such as a random access memory (RAM) or other dynamic storage device, coupled to bus 2002 for storing information and instructions to be executed by processor 2004. Main memory 2006 also may be used for storing temporary variables or other intermediate information during execution of instructions to be executed by processor 2004. Such instructions, when stored in non-transitory storage media accessible to processor 2004, render computer system 2000 into a special-purpose machine that is customized to perform the operations specified in the instructions.

Computer system 2000 further includes a read only memory (ROM) 2008 or other static storage device coupled to bus 2002 for storing static information and instructions for processor 2004. A storage device 2010, such as a magnetic disk, optical disk, or solid-state drive is provided and coupled to bus 2002 for storing information and instructions.

Computer system 2000 may be coupled via bus 2002 to a display 2012, such as a cathode ray tube (CRT), for displaying information to a computer user. An input device 2014, including alphanumeric and other keys, is coupled to bus 2002 for communicating information and command selections to processor 2004. Another type of user input device is cursor control 2016, such as a mouse, a trackball, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane.

Computer system 2000 may implement the techniques described herein using customized hard-wired logic, one or more ASICs or FPGAs, firmware and/or program logic which in combination with the computer system causes or programs computer system 2000 to be a special-purpose machine. According to one embodiment, the techniques herein are performed by computer system 2000 in response to processor 2004 executing one or more sequences of one or more instructions contained in main memory 2006. Such instructions may be read into main memory 2006 from another storage medium, such as storage device 2010. Execution of the sequences of instructions contained in main memory 2006 causes processor 2004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 2010. Volatile media includes dynamic memory, such as main memory 2006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2002. Transmission media can also take the form of acoustic or light waves, such as those generated during radio-wave and infra-red data communications.

Various forms of media may be involved in carrying one or more sequences of one or more instructions to processor 2004 for execution. For example, the instructions may initially be carried on a magnetic disk or solid-state drive of a remote computer. The remote computer can load the instructions into its dynamic memory and send the instructions over a telephone line using a modem. A modem local to computer system 2000 can receive the data on the telephone line and use an infra-red transmitter to convert the data to an infra-red signal. An infra-red detector can receive the data carried in the infra-red signal and appropriate circuitry can place the data on bus 2002. Bus 2002 carries the data to main memory 2006, from which processor 2004 retrieves and executes the instructions. The instructions received by main memory 2006 may optionally be stored on storage device 2010 either before or after execution by processor 2004.

Computer system 2000 also includes a communication interface 2018 coupled to bus 2002. Communication interface 2018 provides a two-way data communication coupling to a network link 2020 that is connected to a local network 2022. For example, communication interface 2018 may be an integrated services digital network (ISDN) card, cable modem, satellite modem, or a modem to provide a data communication connection to a corresponding type of telephone line. As another example, communication interface 2018 may be a local area network (LAN) card to provide a data communication connection to a compatible LAN. Wireless links may also be implemented. In any such implementation, communication interface 2018 sends and receives electrical, electromagnetic or optical signals that carry digital data streams representing various types of information.

Network link 2020 typically provides data communication through one or more networks to other data devices. For example, network link 2020 may provide a connection through local network 2022 to a host computer 2024 or to data equipment operated by an Internet Service Provider (ISP) 2026. ISP 2026 in turn provides data communication services through the world wide packet data communication network now commonly referred to as the "Internet" 2028. Local network 2022 and Internet 2028 both use electrical, electromagnetic or optical signals that carry digital data streams. The signals through the various networks and the signals on network link 2020 and through communication interface 2018, which carry the digital data to and from computer system 2000, are example forms of transmission media.

Computer system 2000 can send messages and receive data, including program code, through the network(s), network link 2020 and communication interface 2018. In the Internet example, a server 2030 might transmit a requested code for an application program through Internet 2028, ISP 2026, local network 2022 and communication interface 2018.

The received code may be executed by processor 2004 as it is received, and/or stored in storage device 2010, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
   storing, at a social networking server computer, account information for a plurality of social networking accounts comprising geographic data and user identification data;
   receiving, through a graphical user interface executing on a first computing device associated with a first social networking account of the plurality of social networking accounts, input requesting one or more services from a particular type of service provider in a particular geographic region wherein the input does not identify a requested service provider;
   identifying one or more second social networking accounts of the plurality of social networking accounts, based, at least in part, on account information for the one or more second social networking accounts that indicates that the one or more second social networking accounts are associated with the particular type of service provider for the particular geographic region;
   in response to receiving the input requesting the one or more services from the particular type of service provider in the particular region, automatically sending, over a network to one or more second computing devices associated with the one or more second social networking accounts, a service request corresponding to the received input from the first computing device, wherein sending the service request to the second one or more computing devices comprises:
      identifying an optimal subset of the second one or more computing devices;
      sending the service request to the optimal subset of the second one or more computing devices;
      determining that the social networking server computer has not received a threshold number of responses to the service request indicating availability to fulfill the service request from the optimal subset of the second one or more computing devices;
      in response to the determining, identifying a sub-optimal subset of the second one or more computing devices;
   sending the service request to the sub-optimal subset of the second one or more computing devices;
   receiving, from a particular computing device of the one or more second computing devices, a response to the service request indicating an availability to fulfill the service request;
   in response to receiving the response from the particular computing device, sending, to the first computing device, an identification of a particular social networking account associated with the particular computing device and the response to the service request indicating the availability to fulfill the service request;
   receiving, through the graphical user interface executing on the first computing device, input selecting a hire option for the particular social networking account;
   sending, to the particular computing device, a message indicating that the particular social networking account associated with the second computing device has been selected to fulfill the service request.

2. The method of claim 1, wherein receiving, through the graphical user interface executing on the first computing device, input requesting one or more services from the particular type of service provider in the particular geographic region comprises:
   causing displaying, on the first computing device, a menu containing a plurality of types of service providers;
   receiving a selection of the particular type of service provider;
   generating, based on the selection of the particular type of service provider, one or more controls for entering specific information pertaining to the request for one or more services from the particular type of service provider.

3. The method of claim 2:
wherein the particular type of service provider is a babysitter;
wherein the one or more controls for entering specific information pertaining to the request include a first control for entering a number of children, one or more second controls for entering an age, gender, and name for each child, and a third control for entering additional information additional information.

4. The method of claim 1 further comprising:
prior to receiving, from the first computing device, the input selecting the hire option for the particular social networking account, receiving, from one or more alternate computing devices of the one or more second computing devices, one or more alternate responses to the service request indicating an availability to fulfill the service request;
in response to receiving, from the first computing device, the input selecting the hire option for the particular social networking account, sending, to the one or more alternate computing devices, a message indicating that one or more alternate social networking accounts associated with the one or more alternate computing devices were not selected to fulfill the service request.

5. The method of claim 1 wherein identifying the optimal subset of the second one or more computing devices comprises one or more of:
identifying preferred computing devices that meet one or more preferences of the first computing device associated with the input requesting one or more services from the particular type of service provider in the particular geographic region;
identifying responsive computing devices based on past transaction data indicating that the responsive computing devices generally respond to service requests within a threshold period of time;
identifying recommended computing devices based on past transaction data indicating recommendations of recommended social networking accounts associated with the recommended computing devices by one or more other social networking accounts;
identifying previously used computing devices that were selected to fulfill a prior service request by the first computing device;
identifying geographically convenient computing devices associated with geographic regions within a threshold distance from the particular geographic region;
identifying requesting computing devices that requested first contact for requests for the particular type of service provider.

6. The method of claim 1:
wherein sending the service request to the one or more second computing devices comprises sending job details without sending an identification of the first social networking account;
wherein sending the message to the particular computing device comprises sending the identification of the first social networking account.

7. The method of claim 1, further comprising:
prior to receiving input selecting the hire option for the particular social networking account, receiving, from the first computing device, a selection of the particular social networking account;
determining that one or more stored comments identify the particular social networking account and contain data regarding one or more qualifications of a user of the particular social networking account as the particular type of service provider;
causing displaying, on the first computing device, a graphical user interface comprising an identification of the particular social networking account and the one or more stored comments.

8. The method of claim 1, wherein the input requesting one or more services from the particular type of service provider in the particular geographic region comprises input identifying time and day for the service request, the method further comprising:
determining that the time and day for the service request is within a particular amount of time from a current time and, in response, sending a reminder message to the particular computing device indicating that the time and day for the service is within the particular amount of time from the current time.

9. The method of claim 1, wherein the input requesting one or more services from the particular type of service provider in the particular geographic region comprises input identifying a time and day for the service request, the method further comprising:
determining that the time and day for the service request passed a particular amount of time prior to a current time and, in response, sending a message to the first computing device, requesting a recommendation of a user associated with the particular social networking account as the particular type of service provider;
receiving, from the first computing device, recommendation input indicating a recommendation of the user associated with the particular social networking account as the particular type of service provider;
storing the recommendation input with the particular social networking account.

10. The method of claim 1, further comprising:
in response to sending the service request to the one or more second computing devices, causing displaying on the one or more second computing devices:
a timer that indicates an amount of time that has passed since the service request was sent to the one or more computing devices; and
a counter that indicates a number of other computing devices that have sent a response to the service request indicating an availability to fulfill the service request.

11. The method of claim 1, wherein the response to the service request from the particular computing device indicating the availability to fulfill the service request includes a bid for fulfilling the service request.

12. One or more non-transitory computer readable media storing instructions which, when executed by one or more processors, cause performance of:
storing, at a social networking server computer, account information for a plurality of social networking accounts comprising geographic data and user identification data;
receiving, through a graphical user interface executing on a first computing device associated with a first social networking account of the plurality of social networking accounts, input requesting one or more services from a particular type of service provider in a particular geographic region wherein the input does not identify a requested service provider;
identifying one or more second social networking accounts of the plurality of social networking accounts, based, at least in part, on account information for the one or more second social networking accounts that indicates that the one or more second social networking accounts are associated with the particular type of service provider for the particular geographic region;

in response to receiving the input requesting the one or more services from the particular type of service provider in the particular region, automatically sending, over a network to one or more second computing devices associated with the one or more second social networking accounts, a service request corresponding to the received input from the first computing device, wherein sending the service request to the second one or more computing devices comprises:

identifying an optimal subset of the second one or more computing devices;

sending the service request to the optimal subset of the second one or more computing devices;

determining that the social networking server computer has not received a threshold number of responses to the service request indicating availability to fulfill the service request from the optimal subset of the second one or more computing devices;

in response to the determining, identifying a sub-optimal subset of the second one or more computing devices;

receiving, from a particular computing device of the one or more second computing devices, a response to the service request indicating an availability to fulfill the service request;

in response to receiving the response from the particular computing device, sending, to the first computing device, an identification of a particular social networking account associated with the particular computing device and the response to the service request indicating the availability to fulfill the service request;

receiving, through the graphical user interface executing on the first computing device, input selecting a hire option for the particular social networking account;

sending, to the particular computing device, a message indicating that the particular social networking account associated with the second computing device has been selected to fulfill the service request.

13. The one or more non-transitory computer readable media of claim 12, wherein receiving, through the graphical user interface executing on the first computing device, input requesting one or more services from the particular type of service provider in the particular geographic region comprises:

causing displaying, on the first computing device, a menu containing a plurality of types of service providers;

receiving a selection of the particular type of service provider;

generating, based on the selection of the particular type of service provider, one or more controls for entering specific information pertaining to the request for one or more services from the particular type of service provider.

14. The one or more non-transitory computer readable media of claim 13:

wherein the particular type of service provider is a babysitter;

wherein the one or more controls for entering specific information pertaining to the request include a first control for entering a number of children, one or more second controls for entering an age, gender, and name for each child, and a third control for entering additional information additional information.

15. The one or more non-transitory computer readable media of claim 12 wherein the instructions, when executed by the one or more processors further cause performance of:

prior to receiving, from the first computing device, the input selecting the hire option for the particular social networking account, receiving, from one or more alternate computing devices of the one or more second computing devices, one or more alternate responses to the service request indicating an availability to fulfill the service request;

in response to receiving, from the first computing device, the input selecting the hire option for the particular social networking account, sending, to the one or more alternate computing devices, a message indicating that one or more alternate social networking accounts associated with the one or more alternate computing devices were not selected to fulfill the service request.

16. The one or more non-transitory computer readable media of claim 12 wherein identifying the optimal subset of the second one or more computing devices comprises one or more of:

identifying preferred computing devices that meet one or more preferences of the first computing device associated with the input requesting one or more services from the particular type of service provider in the particular geographic region;

identifying responsive computing devices based on past transaction data indicating that the responsive computing devices generally respond to service requests within a threshold period of time;

identifying recommended computing devices based on past transaction data indicating recommendations of recommended social networking accounts associated with the recommended computing devices by one or more other social networking accounts;

identifying previously used computing devices that were selected to fulfill a prior service request by the first computing device;

identifying geographically convenient computing devices associated with geographic regions within a threshold distance from the particular geographic region;

identifying requesting computing devices that requested first contact for requests for the particular type of service provider.

17. The one or more non-transitory computer readable media of claim 12:

wherein sending the service request to the one or more second computing devices comprises sending job details without sending an identification of the first social networking account;

wherein sending the message to the particular computing device comprises sending the identification of the first social networking account.

18. The one or more non-transitory computer readable media of claim 12 wherein the instructions, when executed by the one or more processors further cause performance of:

prior to receiving input selecting the hire option for the particular social networking account, receiving, from the first computing device, a selection of the particular social networking account;

determining that one or more stored comments identify the particular social networking account and contain data regarding one or more qualifications of a user of the particular social networking account as the particular type of service provider;

causing displaying, on the first computing device, a graphical user interface comprising an identification of the particular social networking account and the one or more stored comments.

19. The one or more non-transitory computer readable media of claim 12, wherein the input requesting one or more services from the particular type of service provider in the particular geographic region comprises input identifying time and day for the service request, wherein the instructions, when executed by the one or more processors further cause performance of:
- determining that the time and day for the service request is within a particular amount of time from a current time and, in response, sending a reminder message to the particular computing device indicating that the time and day for the service is within the particular amount of time from the current time.

20. The one or more non-transitory computer readable media of claim 12, wherein the input requesting one or more services from the particular type of service provider in the particular geographic region comprises input identifying a time and day for the service request, wherein the instructions, when executed by the one or more processors, further cause performance of:
- determining that the time and day for the service request passed a particular amount of time prior to a current time and, in response, sending a message to the first computing device, requesting a recommendation of a user associated with the particular social networking account as the particular type of service provider;
- receiving, from the first computing device, recommendation input indicating a recommendation of the user associated with the particular social networking account as the particular type of service provider;
- storing the recommendation input with the particular social networking account.

21. The one or more non-transitory computer readable media of claim 12 wherein the instructions, when executed by the one or more processors further cause performance of:
- in response to sending the service request to the one or more second computing devices, causing displaying on the one or more second computing devices:
  - a timer that indicates an amount of time that has passed since the service request was sent to the one or more computing devices; and
  - a counter that indicates a number of other computing devices that have sent a response to the service request indicating an availability to fulfill the service request.

22. The one or more non-transitory computer readable media of claim 12, wherein the response to the service request from the particular computing device indicating the availability to fulfill the service request includes a bid for fulfilling the service request.

* * * * *

EX PARTE REEXAMINATION CERTIFICATE (11929th)

United States Patent
Donahoe et al.

(10) Number: US 10,122,671 C1
(45) Certificate Issued: Oct. 21, 2021

(54) IDENTIFYING SERVICE PROVIDERS FOR ELECTRONICALLY RECEIVED SERVICE REQUESTS AND USING STORED ACCOUNT DATA TO CONNECT THE REQUESTER WITH PROVIDERS

(71) Applicant: Nextdoor.com, Inc., San Francisco, CA (US)

(72) Inventors: Thomas Donahoe, San Francisco, CA (US); Thomas K. Kaehler, San Francisco, CA (US); Gregory James, Concord, CA (US); Clifton Ray Williams, Berkeley, CA (US); Daniel J. Clancy, Los Altos, CA (US); Nirav N. Tolia, San Francisco, CA (US)

(73) Assignee: NEXTDOOR, INC., San Francisco, CA (US)

Reexamination Request:
No. 90/014,695, Apr. 1, 2021

Reexamination Certificate for:
Patent No.: 10,122,671
Issued: Nov. 6, 2018
Appl. No.: 14/930,264
Filed: Nov. 2, 2015

Related U.S. Application Data

(60) Provisional application No. 62/181,696, filed on Jun. 18, 2015.

(51) Int. Cl.
*G06Q 50/00* (2012.01)
*G06Q 50/10* (2012.01)
*H04L 29/08* (2006.01)
*H04L 12/58* (2006.01)
*G06F 15/16* (2006.01)
*H04L 15/32* (2006.01)

(52) U.S. Cl.
CPC ............ *H04L 15/32* (2013.01); *G06Q 50/01* (2013.01); *G06Q 50/10* (2013.01); *H04L 67/306* (2013.01)

(58) Field of Classification Search
None
See application file for complete search history.

(56) References Cited

To view the complete listing of prior art documents cited during the proceeding for Reexamination Control Number 90/014,695, please refer to the USPTO's public Patent Application Information Retrieval (PAIR) system under the Display References tab.

*Primary Examiner* — Woo H Choi

(57) ABSTRACT

A system and method for facilitating the locating and hiring of service providers is provided. In an embodiment, a social networking server provides an interface for users of social networking accounts to create service request. When the social networking server computer receives a service request for a particular type of service provider, the social networking server computer identifies service providers of the particular type and sends the service request to the service providers. In response to receiving an indication that a particular service provider is available to fulfill a service request, the social networking server computer sends a message to the service requester that identifies the particular service provider and indicates that the service provider is available to fulfill the service request. In response to receiving an indication from the service requester that the service requester wishes to hire the service provider, the social networking server computer sends a message to the service provider indicating that the service provider has been hired to fulfill the service request.

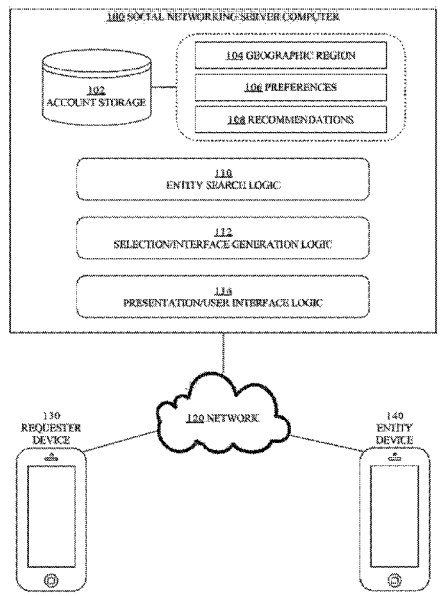

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-22 is confirmed.

\* \* \* \* \*